US012573746B2

(12) United States Patent
Kim et al.

(10) Patent No.: US 12,573,746 B2
(45) Date of Patent: Mar. 10, 2026

(54) WEARABLE ELECTRONIC DEVICE COMPRISING ANTENNA

(71) Applicant: Samsung Electronics Co., Ltd., Suwon-si (KR)

(72) Inventors: Jaehyung Kim, Suwon-si (KR); Younghoon Suh, Suwon-si (KR); Dongjun Oh, Suwon-si (KR); Jaehoon Jo, Suwon-si (KR); Nakchung Choi, Suwon-si (KR); Jaewon Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 18/759,448

(22) Filed: Jun. 28, 2024

(65) Prior Publication Data

US 2024/0356204 A1 Oct. 24, 2024

Related U.S. Application Data

(63) Continuation of application No. PCT/KR2022/021131, filed on Dec. 23, 2022.

(30) Foreign Application Priority Data

Dec. 31, 2021 (KR) ........................ 10-2021-0194125
Feb. 8, 2022 (KR) ........................ 10-2022-0015947

(51) Int. Cl.
*H01Q 1/27* (2006.01)
*G02C 11/00* (2006.01)
(Continued)

(52) U.S. Cl.
CPC ............. *H01Q 1/273* (2013.01); *G02C 11/10* (2013.01); *H01Q 1/50* (2013.01); *G02C 5/22* (2013.01)

(58) Field of Classification Search
CPC ................................. H01Q 1/273; H01Q 1/50
See application file for complete search history.

(56) References Cited

U.S. PATENT DOCUMENTS

| | | | |
|---|---|---|---|
| 9,746,692 | B1 | 8/2017 | Streets et al. |
| 2006/0052146 | A1 | 3/2006 | Ou |
| 2018/0212314 | A1 | 7/2018 | Rautio |

FOREIGN PATENT DOCUMENTS

| | | |
|---|---|---|
| JP | 2002247484 A | 8/2002 |
| JP | 2013098939 A | 5/2013 |

(Continued)

OTHER PUBLICATIONS

International Search Report for PCT/KR2022/021131 mailed Mar. 28, 2023, 4 pages.

(Continued)

*Primary Examiner* — Graham P Smith
(74) *Attorney, Agent, or Firm* — Nixon & Vanderhye, P.C.

(57) ABSTRACT

A wearable electronic device may comprise: a lens frame configured to accommodate a lens; a front frame including a connection frame extending from the lens frame; a temple rotatably connected to the connection frame and configured to rotate about a rotary shaft, and to operate to be in a first state of being folded to form a first angle with respect to the lens frame or a second state of being unfolded to form a second angle with respect to the lens frame; a printed circuit board disposed in the temple, and on which a wireless communication circuit is disposed; and an antenna structure including an antenna electrically connected to the wireless communication circuit. The antenna structure may comprise: a coupling terminal disposed at an end of the temple at which the rotary shaft is located; a first antenna disposed on the front frame and including a first connection portion having at least a portion of a surface facing the coupling (Continued)

terminal; and a feeder configured to apply an electrical signal to the first antenna member through the coupling terminal. The coupling terminal may comprise: a first terminal portion configured to be coupled to the first connection portion in the first state; and a second terminal portion configured to be coupled to the first connection portion in the second state.

20 Claims, 16 Drawing Sheets

(51) Int. Cl.
    *H01Q 1/50*         (2006.01)
    *G02C 5/22*         (2006.01)

(56) References Cited

FOREIGN PATENT DOCUMENTS

| | | |
|---|---|---|
| JP | 5944134 B2 | 6/2016 |
| JP | 2017175438 A | 9/2017 |
| JP | 2021-129497 | 9/2021 |
| KR | 10-2016-0071572 | 6/2016 |
| KR | 102005997 B1 | 7/2019 |
| KR | 102026796 B1 | 9/2019 |
| KR | 20200029592 A | 3/2020 |
| KR | 20220065631 A | 5/2022 |

OTHER PUBLICATIONS

Written Opinion of the ISA for PCT/KR2022/021131 mailed Mar. 28, 2023, 5 pages.
Extended European Search Report dated Mar. 7, 2025 issued in European Patent Application No. 22916617.8.

WEARABLE ELECTRONIC DEVICE COMPRISING ANTENNA

CROSS-REFERENCE TO RELATED APPLICATIONS

This application is a continuation of International Application No. PCT/KR2022/021131 designating the United States, filed on Dec. 23, 2022, in the Korean Intellectual Property Receiving Office and claiming priority to Korean Patent Application Nos. 10-2021-0194125, filed on Dec. 31, 2021, and 10-2022-0015947, filed on Feb. 8, 2022, in the Korean Intellectual Property Office, the disclosures of each of which are incorporated by reference herein in their entireties.

BACKGROUND

Field

The disclosure relates to a wearable electronic device including an antenna.

Description of Related Art

As technology advances, electronic devices capable of wireless voice calls and information exchange have become necessities of life. Electronic devices have been initially recognized as simple portable devices capable of making wireless calls, but with the advancement of technology and the introduction of the broadband Internet, the electronic devices have moved beyond devices that implement simple call functions to multimedia devices that perform various functions such as games, video, and filming.

An electronic device for providing an augmented reality (AR) service has been introduced on the market. An AR service is a service of superimposing a virtual image having supplementary information on a real-world image seen by a user and showing the superimposition result, and may provide a user with a virtual image including content related to a real object identified from the real-world image.

An electronic device providing an AR service may operate while worn on the body, for example, the face of a user. Such an electronic device may include, for example, a wearable electronic device, for example, a glass-type electronic device.

Wearable electronic devices for providing an augmented reality (AR) service of superimposing a virtual image on a real-world image recognized by eyes of a user and showing the superimposition result are being developed. The wearable electronic devices for providing the AR service may be shaped in a form of glasses such that they may be worn on the face of a user. The wearable electronic device may include lens portions placed to correspond to the user's eyes and temple portions worn on ears of a user. The wearable electronic device may include an antenna to implement a wireless communication function. In order to secure an installation space for a radiator that implements a radiation function of electromagnetic waves, antenna elements may be separately arranged in each portion of the wearable electronic device, for example, the lens portion and the temple portion. In this case, it may be difficult to secure reliability of components arranged adjacent to a hinge among components included in the antenna according to a rotational motion of the temple portion.

SUMMARY

Embodiments of the disclosure provide a wearable electronic device including an antenna.

Embodiments of the disclosure provide a wearable electronic device in which a wireless communication circuit is separately arranged from an antenna member that performs an antenna function on both sides of a hinge, hereby reducing damage to an antenna component due to a hinge operation and improving service life.

Embodiments of the disclosure provide a wearable electronic device that feeds power to a radiator through a non-contact manner, to secure reliability of an antenna according to the operation of the wearable electronic device.

A wearable electronic device according to an example embodiment may include: a front frame including a lens frame configured to accommodate a lens, and a connection frame extending from the lens frame, a temple rotatably connected to the connection frame and configured to rotate about a rotation axis and configured to operate in a first state of being folded to form a first angle with respect to the lens frame or a second state of being unfolded to form a second angle with respect to the lens frame, a printed circuit board (PCB) disposed in the temple and on which a wireless communication circuit is disposed, and an antenna structure including an antenna electrically connected to the wireless communication circuit. The antenna structure may include: a coupling terminal disposed on an end portion of the temple where the rotation axis is positioned, a first antenna disposed on the front frame and including a first connection portion of which at least a portion of a surface faces the coupling terminal, and a feeder configured to apply an electrical signal to the first antenna member through the coupling terminal. The coupling terminal may include: a first terminal portion to be coupled to the first connection portion in the first state, and a second terminal portion to be coupled to the first connection portion in the second state.

A wearable electronic device according to an example embodiment may include: a front frame including a lens frame configured to accommodate a lens, and a connection frame extending from the lens frame, a temple connected to the connection frame opposite to the front frame, a hinge configured to rotatably connect the connection frame and the temple about a rotation axis to be in a first state of being folded to form a first angle with respect to the lens frame or a second state of being unfolded to form a second angle with respect to the lens frame, a PCB disposed in the temple and on which a wireless communication circuit is disposed, and an antenna structure including an antenna electrically connected to the wireless communication circuit. The antenna structure may include: a coupling terminal disposed on an end portion of the temple adjacent to the hinge, a feeder configured to apply an electrical signal to the coupling terminal, and one or more antennas at least a portion of which is disposed on the connection frame and configured to receive the electrical signal applied by the feeder through the coupling terminal. The one or more antennas may include a first antenna including a first connection portion with a surface facing a connection direction orthogonal to the rotation axis. The coupling terminal may include, based on a state viewed in the connection direction, a first terminal portion that overlaps the first connection portion in the first state, and a second terminal portion that overlaps the first connection portion in the second state.

A wearable electronic device according to an example embodiment may include: a front frame including a lens frame configured to accommodate a lens, and a connection frame extending from the lens frame, a temple rotatably connected to the connection frame and configured to rotate about a rotation axis and operate to be in a first state of being folded to form a first angle with respect to the lens frame or a second state of being unfolded to form a second angle with respect to the lens frame, a PCB disposed in the temple and on which a wireless communication circuit is disposed, and an antenna structure including an antenna electrically connected to the wireless communication circuit. The antenna structure may include: a coupling terminal disposed on an end portion of the temple on which the rotation axis is positioned, a feeder configured to apply an electrical signal to the coupling terminal, and an antenna disposed on the front frame and configured to be electrically coupled to the coupling terminal in a non-contact state to receive an electrical signal applied by the feeder. The coupling terminal may include a first terminal portion with a surface facing a first direction orthogonal to the rotation axis, a second terminal portion with a surface facing a second direction that is orthogonal to the rotation axis and different from the first direction, and a connecting terminal portion configured to connect the first terminal portion and the second terminal portion and having a curved surface. The antenna may overlap the first terminal portion in the first direction in the first state, and overlap the second terminal portion in the second direction in the second state.

According to an example embodiment, an antenna, on which a lens frame is disposed, is electromagnetically connected to a PCB disposed in a temple and on which a wireless communication circuit is disposed in a non-contact manner, thereby preventing/reducing damage to the antenna member according to a rotation motion of the temple.

According to an example embodiment, power is fed to a coupling terminal to be electrically coupled to the antenna, thereby reducing damage to the antenna according to a rotation motion of a temple.

According to an example embodiment, a plurality of portions to be selectively coupled to an antenna member according to a rotation of a temple is formed on a coupling terminal, thereby securing stable power feeding performance regardless of a state of a wearable electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
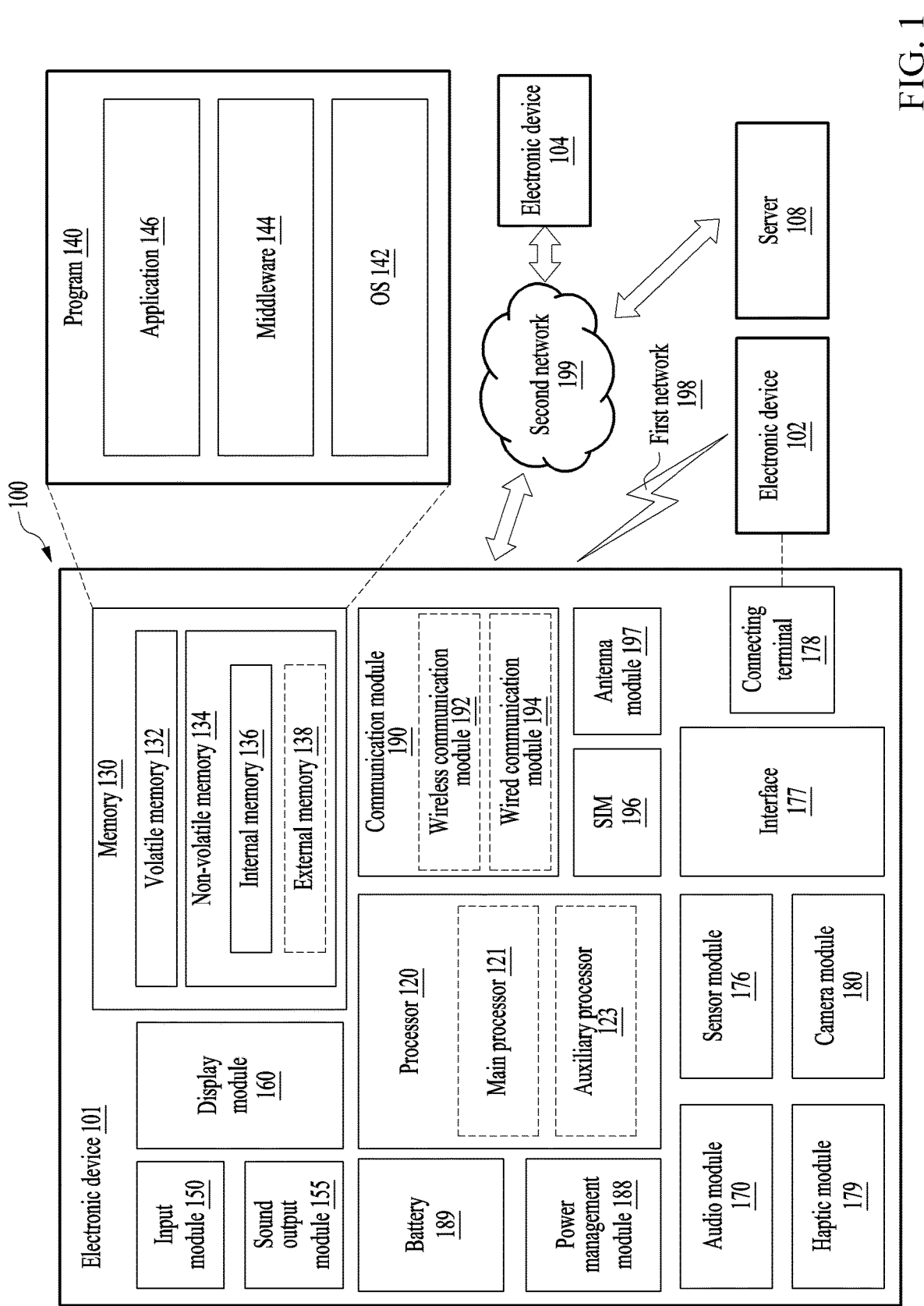
FIG. 1 is a block diagram illustrating an example electronic device in a network environment according to various embodiments.

Hereinafter, various example embodiments will be described in greater detail with reference to the accompanying drawings. When describing the various example embodiments with reference to the accompanying drawings, like reference numerals refer to like components, and any repeated description related thereto may be omitted.

FIG. 1 is a block diagram illustrating an example electronic device in a network environment according to embodiments. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various data may include, for example, software (e.g., the program 140)

and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146. The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, or the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to an embodiment, the antenna module 197 may form a mm Wave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mm Wave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a portion of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to the various embodiments disclosed herein may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that various embodiments of the present disclosure and the terms used therein are not intended to limit the technological features set forth herein to various embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1$^{st}$," and "2$^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
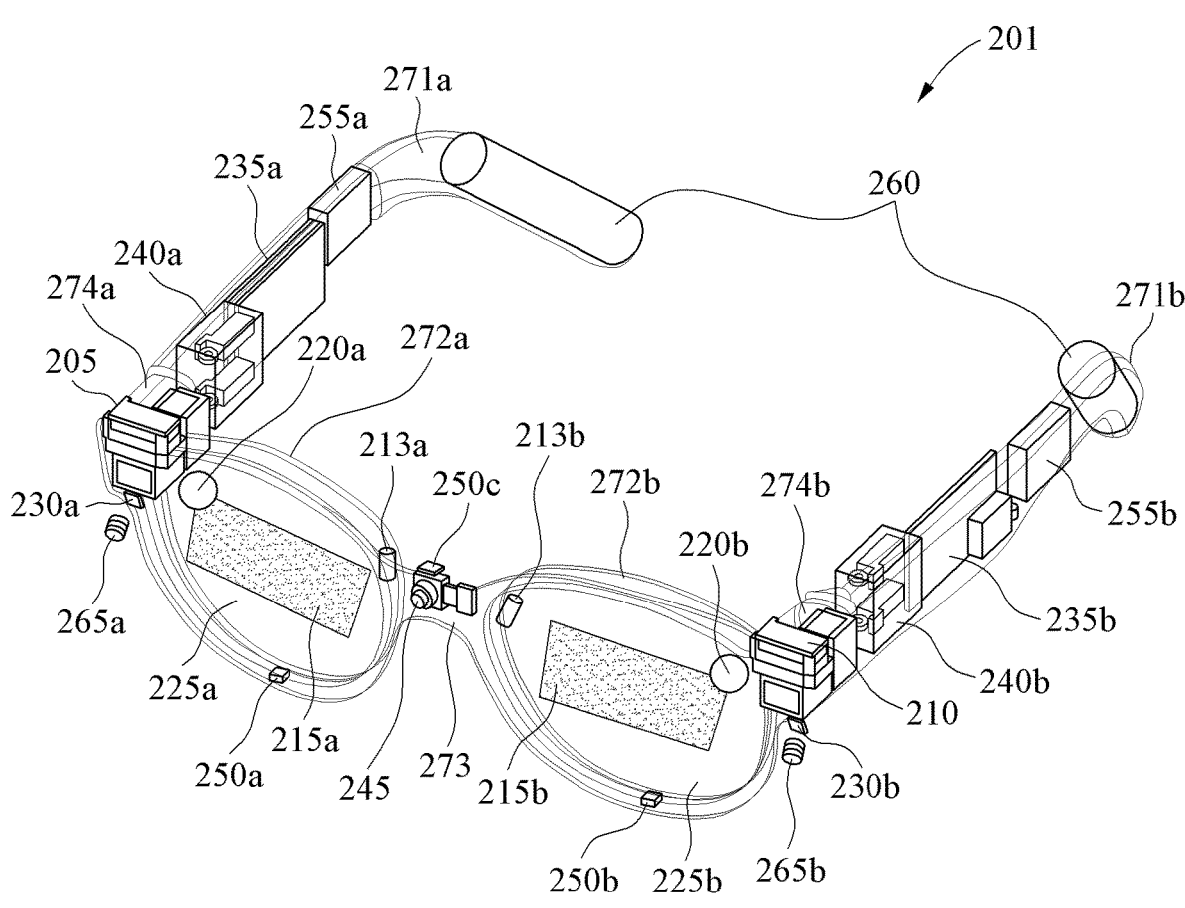
FIG. 2 is a front perspective view illustrating an example structure of a wearable electronic device according to various embodiments.

FIG. 2 is a front perspective view illustrating an example structure of a wearable electronic device according to various embodiments.

Referring to FIG. 2, a wearable electronic device 2011 (e.g., the electronic device 101 of FIG. 1) may be worn on a face of a user to provide the user with an image related to an augmented reality (AR) service and/or a virtual reality (VR) service.

In an embodiment, the wearable electronic device 2011 may include a first display 205, a second display 210, optical waveguides 215a and 215b, input optical members 220a and 220b, a first transparent member 225a, a second transparent member 225b, lighting units 230a and 230b, a first PCB 235a, a second PCB 235b, a first hinge 240a, a second hinge 240b, a first camera 245, a plurality of microphones (e.g., a first microphone 250a, a second microphone 250b, and a third microphone 250c), a plurality of speakers (e.g., a first speaker 255a, and a second speaker 255b), a battery 260, a second camera 265a, and a third camera 265b.

In an embodiment, a display (e.g., the first display 205, the second display 210, and the display module 160 of FIG. 1) may include, for example, a liquid crystal display (LCD), a digital mirror device (DMD), or a liquid crystal on silicon (LCoS), an organic light-emitting diode (OLED), a micro light-emitting diode (micro-LED), or the like. Although not shown, when the display is one of an LCD, a DMD, and an LCoS, the wearable electronic device 201 may include a light source configured to emit light to a screen output area of the display. In an embodiment, when the display is capable of generating light by itself, for example, when the display is either an OLED or a micro-LED, the wearable electronic device 201 may provide a virtual image with a relatively high quality to the user even though a separate light source is not included. In an embodiment, when the display is implemented as an OLED or a micro LED, a light source may be unnecessary, and accordingly the wearable electronic device 201 may be reduced in weight. Hereinafter, a display capable of generating light by itself may be referred to as a "self-luminous display", and a description will be made on the assumption of the self-luminous display.

A display (e.g., the first display 205 and the second display 210) according to an embodiment may include at least one micro-LED. For example, the micro LED may express red (R), green (G), and blue (B) by emitting light by itself, and a single chip may implement a single pixel (e.g., one of R, G, and B pixels) because the micro LED is relatively small in size (e.g., 100 μm or less). Accordingly, it may be possible to provide a high resolution without a backlight unit (BLU), when the display is implemented as a micro-LED.

However, embodiments are not limited thereto, and a single chip may be implemented by a plurality of pixels including R, G, and B pixels.

In an embodiment, the display (e.g., the first display 205 and the second display 210) may include pixels for displaying a virtual image. The display may further include infrared pixels that emit infrared light.

In an embodiment, the display may further include light-receiving pixels (e.g., photo sensor pixels) that are disposed between pixels and configured to receive light reflected from eyes of a user, convert the received light to electrical energy, and output the electrical energy. A light-receiving pixel may be referred to as a "gaze tracking sensor". The gaze tracking sensor may detect infrared light generated by reflecting light emitted by an infrared pixel included in the display by eyes of a user.

In an embodiment, the wearable electronic device 201 may include separate gaze tracking cameras 213a and 213b (e.g., IR LED detection sensors). The gaze tracking cameras 213a and 213b may detect infrared light reflected by eyes of a user. The wearable electronic device 201 may track a gaze of a user based on the infrared light detected by the gaze tracking cameras 213a and 213b. The wearable electronic device 201 may determine a central position of a virtual image according to gaze directions (e.g., directions in which pupils of a right eye and a left eye of a user gaze) of a right eye and a left eye of the user.

In an embodiment, the wearable electronic device 201 may detect a gaze direction (e.g., a movement of a pupil) of a user, using the light-receiving pixels. For example, the wearable electronic device 201 may detect and track a gaze direction of a right eye of the user and a gaze direction of a left eye of the user through one or more light-receiving pixels of the first display 205 and one or more light-receiving pixels of the second display 210. The wearable electronic device 201 may determine a central position of a virtual image according to the gaze directions (e.g., directions in which pupils of the right eye and the left eye of the user gaze) of the right eye and the left eye of the user detected through the one or more light-receiving pixels.

The first display 205 and the second display 210 may each include a first control circuit (not shown). The first control circuit may control the first display 205 and the second display 210. The first control circuit may control an operation of a liquid crystal element of a transparent cover (not shown) included in each of the first display 205 and the second display 210.

In an embodiment, light emitted from the display (e.g., the first display 205 and the second display 210) may reach the optical waveguide 215a formed on the first transparent member 225a that faces the right eye of the user, and the optical waveguide 215b formed on the second transparent member 225b that faces the left eye of the user, by passing through a lens (not shown) and a waveguide. For example, the light emitted from the display (e.g., the first display 205 and the second display 210) may be reflected from a grating area of a waveguide formed in the optical waveguides 215a and 215b and the input optical members 220a and 220b, and may be transmitted to the eyes of the user. The first transparent member 225a and/or the second transparent member 225b may be formed as, for example, a glass plate, a plastic plate, or a polymer, and may be transparently or translucently formed. The first transparent member 225a and the second transparent member 225b may each include a transparent substrate on which a transparent electrode formed of, for example, indium tin oxide (ITO), is disposed.

In an embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an embodiment, the optical waveguides 215a and 215b or a transparent member (e.g., the first transparent member 225a and the second transparent member 225b) may include a reflective lens, and a lens including a waveguide. The waveguide may be referred to as an "optical waveguide". The waveguide may be a path through which external light is incident, totally reflected, and emitted, and may be distinguished from the first transparent member 225a and the second transparent member 225b through which external light is simply reflected or transmitted.

In an embodiment, the waveguide may be formed of glass, plastic, or a polymer, and may have a nanopattern formed on one surface of the inside or outside, for example, a grating structure of a polygonal or curved shape. According to an embodiment, light incident to one end of the waveguide through the input optical members 220a and 220b may be propagated inside a display waveguide by the nanopattern to be provided to the user. For example, a waveguide including a freeform prism may provide incident light to a user through a reflection mirror. The waveguide may include at least one diffraction element such as a diffractive optical element (DOE) and a holographic optical element (HOE) or at least one of reflective elements (e.g., a reflection mirror). In an embodiment, the waveguide may guide light emitted from the displays 205 and 210 to the eyes of the user, using at least one diffractive element or a reflective element included in the waveguide.

According to an embodiment, the diffractive element may include the input optical members 220a and 220b and/or an output optical member (not shown). For example, the input optical members 220a and 220b may refer to input grating areas, and the output optical member (not shown) may refer to an output grating area. An input grating area may function as an input terminal to diffract (or reflect) light output from the display (e.g., the first display 205 and the second display 210) (e.g., a micro-LED) to transmit the light to the optical waveguides 215a and 215b. The output grating area may function as an exit to diffract (or reflect) light transmitted to the waveguide to eyes of a user.

The waveguide may function as a path through which light passes. The waveguide may include the input optical members 220a and 220b and an output optical member (not shown). An area of the waveguide in which light is totally reflected may be combined with or separated from the input optical members 220a and 220b and the output optical member (not shown).

According to an embodiment, the reflective element may include a total internal reflection (TIR) optical element or a TIR waveguide for TIR. For example, total reflection, which is one of schemes of inducing light, may form an angle of incidence such that light (e.g., a virtual image) entering through an input grating area is completely or almost completely reflected from one surface (e.g., a specific surface) of the waveguide, to completely or almost completely transmit the light to an output grating area.

In an embodiment, the light emitted from the displays 205 and 210 may be guided by the waveguide through the input optical members 220a and 220b. Light traveling in the waveguide may be guided toward the eyes of the user through the output optical member. A screen display portion of the display may be determined based on light emitted toward the eyes of the user.

In an embodiment, the first camera 245 may be referred to as a "high resolution (HR)" or a "photo video (PV)", and may include a high-resolution camera. The first camera 245 may include a color camera having functions for obtaining a high-quality image, such as an automatic focus (AF) function and an optical image stabilizer (OIS). Embodiments are not limited thereto, and the first camera 245 may include a global shutter (GS) camera or a rolling shutter (RS) camera.

In an embodiment, the second camera 265a and the third camera 265b may include cameras used for three degrees of freedom (3DoF) and six degrees of freedom (6DoF) head tracking, hand detection and tracking, and gesture and/or space recognition. For example, the second camera 265a and the third camera 265b may each include a GS camera to detect a movement of a head or a hand and track the movement.

In an embodiment, at least one sensor (not shown, e.g., a gyro sensor, an acceleration sensor, a geomagnetic sensor, and/or a gesture sensor), the second camera 265a, and the third camera 265b may perform at least one of head tracking for 6DoF, pose estimation and prediction, gesture and/or space recognition, and/or a slam function through depth imaging.

In an embodiment, the second camera 265a and the third camera 265b may be classified and used as a camera for head tracking and a camera for hand tracking.

In an embodiment, the lighting units 230a and 230b may be omitted. The lighting units 230a and 230b may be replaced by infrared pixels included in the first display 205 and the second display 210. In an embodiment, the lighting units 230a and 230b may be included in the wearable electronic device 201 to assist infrared pixels included in the first display 205 and the second display 210. The lighting units 230a and 230b may be used differently according to positions in which the light units 230a and 230b are attached. For example, the lighting units 230a and 230b may be attached together with the second camera 265a and the third camera 265b mounted around a hinge (e.g., the first hinge 240a and the second hinge 240b) that connects frames 272a and 272b and temples 271a and 271b or around a bridge 273 that connects frames. For example, the frames 272a and 272b may be connected to the temples 271a and 271b through connection frames 274a and 274b. If capturing is performed using a GS camera, the lighting units 230a and 230b may be used to supplement a surrounding brightness. For example, the lighting units 230a and 230b may be used in a dark environment or when it is not easy to detect a subject to be captured due to reflected light and mixing of various light sources.

In an embodiment, a second control circuit (not shown, e.g., the processor 120 of FIG. 1) configured to control components of the wearable electronic device 201 other than the first display 205 and the second display 210 may be located in a PCB (e.g., the first PCB 235a and the second PCB 235b). The second control circuit may control components other than the first display 205 and the second display 210 and perform an operation such as depth value estimation. The second control circuit may include a communication circuit (e.g., the communication module 190 of FIG. 1) or a memory (e.g., the memory 130 of FIG. 1). In an embodiment, the first control circuit and the second control circuit may be integrated as a single circuit. For example, an integrated control circuit may control the first display 205, the second display, and/or the other components.

In an embodiment, a plurality of microphones (e.g., the first microphone 250a, the second microphone 250b, and the third microphone 250c, and the input module 150 of FIG. 1) may process an external acoustic signal into electrical sound data. The processed sound data may be variously utilized according to a function (or an application being executed) being performed by the wearable electronic device 201.

In an embodiment, a plurality of speakers (e.g., the first speaker 255a, the second speaker 255b, and the sound output module 155 of FIG. 1) may output audio data received from a communication circuit (e.g., the communication module 190 of FIG. 1) or stored in a memory (e.g., the memory 130 of FIG. 1).

In an embodiment, one or more batteries 260 (e.g., the battery 189 of FIG. 1) may be included and may supply power to components of the wearable electronic device 201.

Figure 3A:
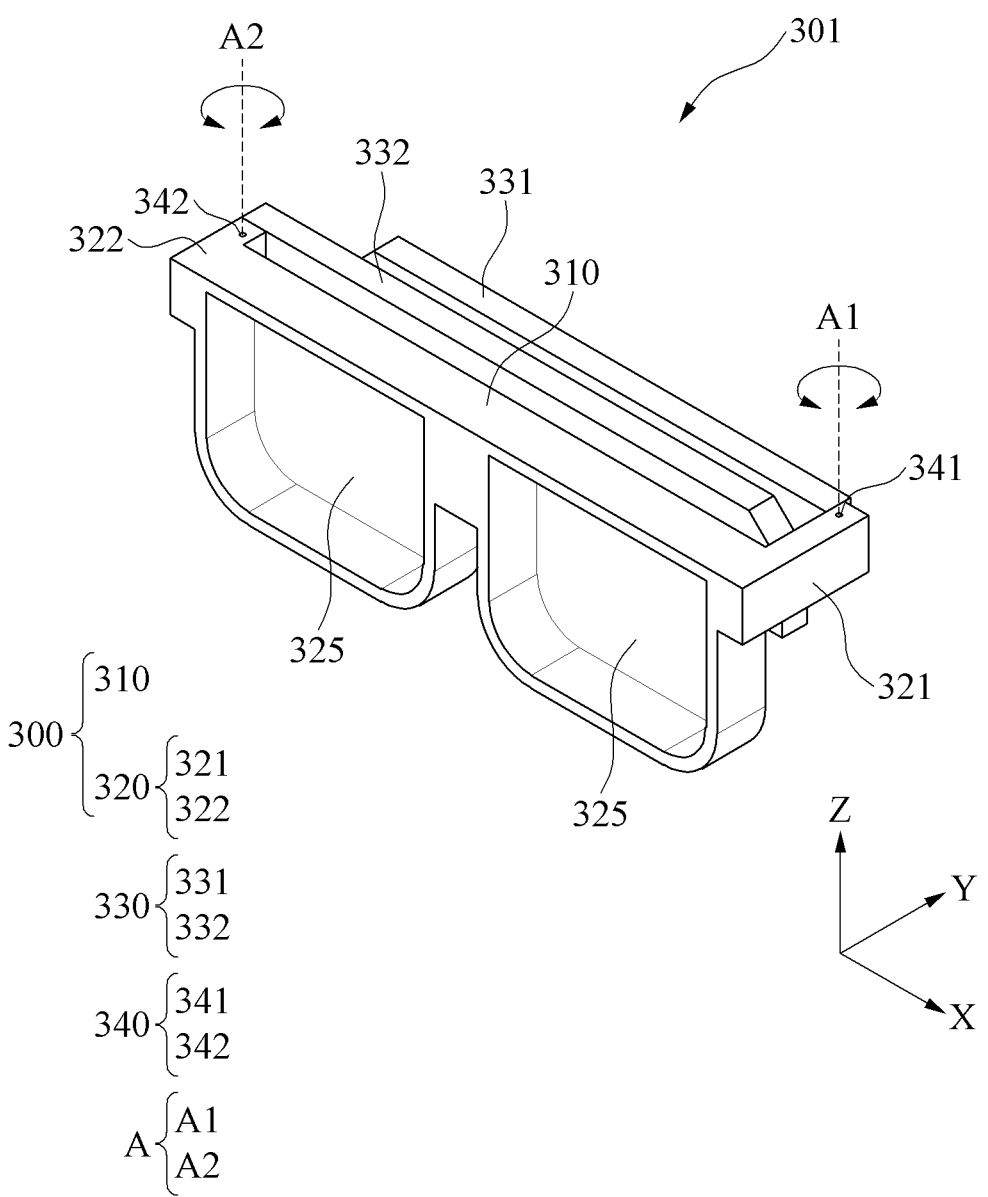
FIGS. 3A and 3B are perspective views respectively illustrating a first state and a second state of a wearable electronic device according to various embodiments
Figure 3B:
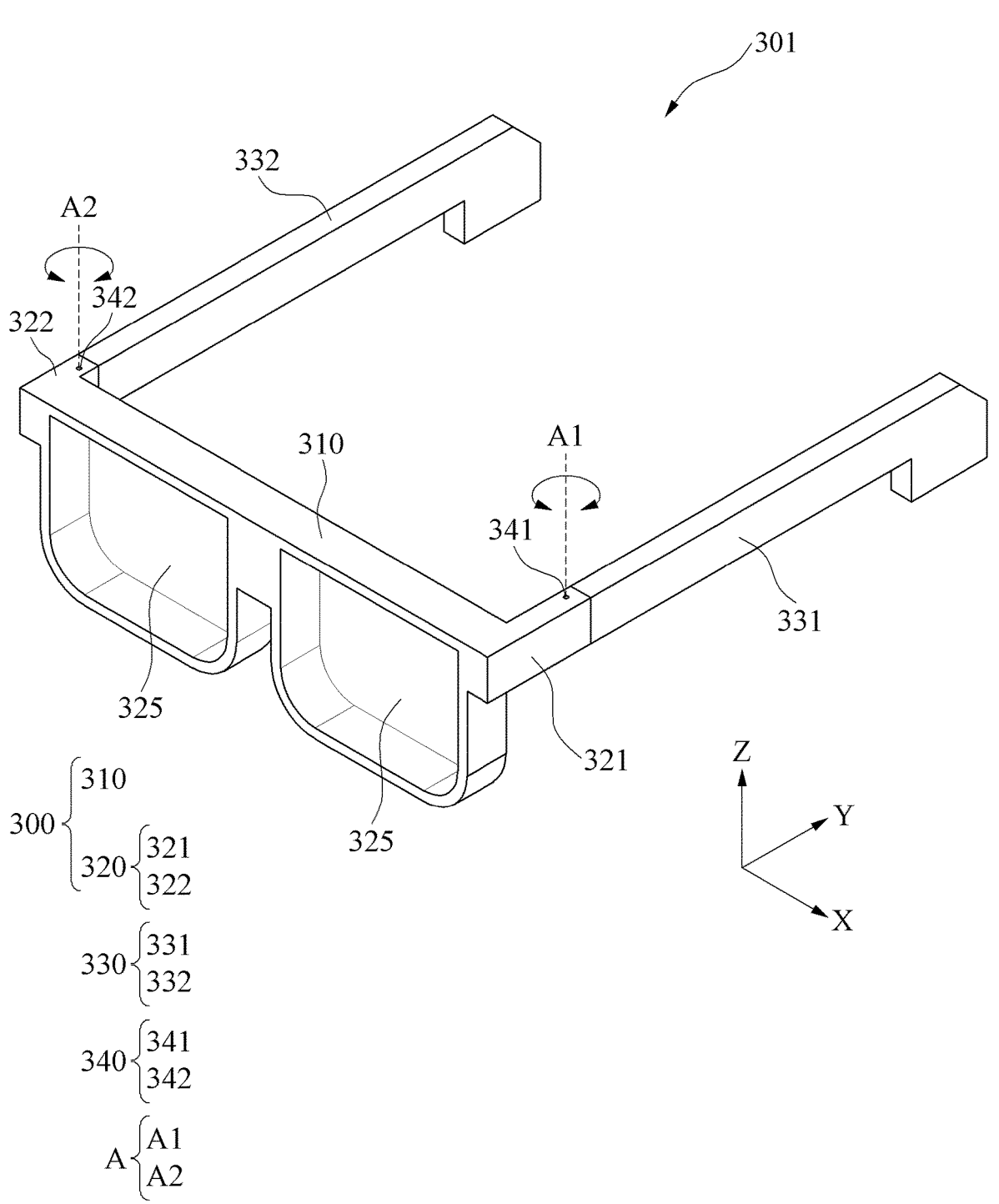
Figure 4A:
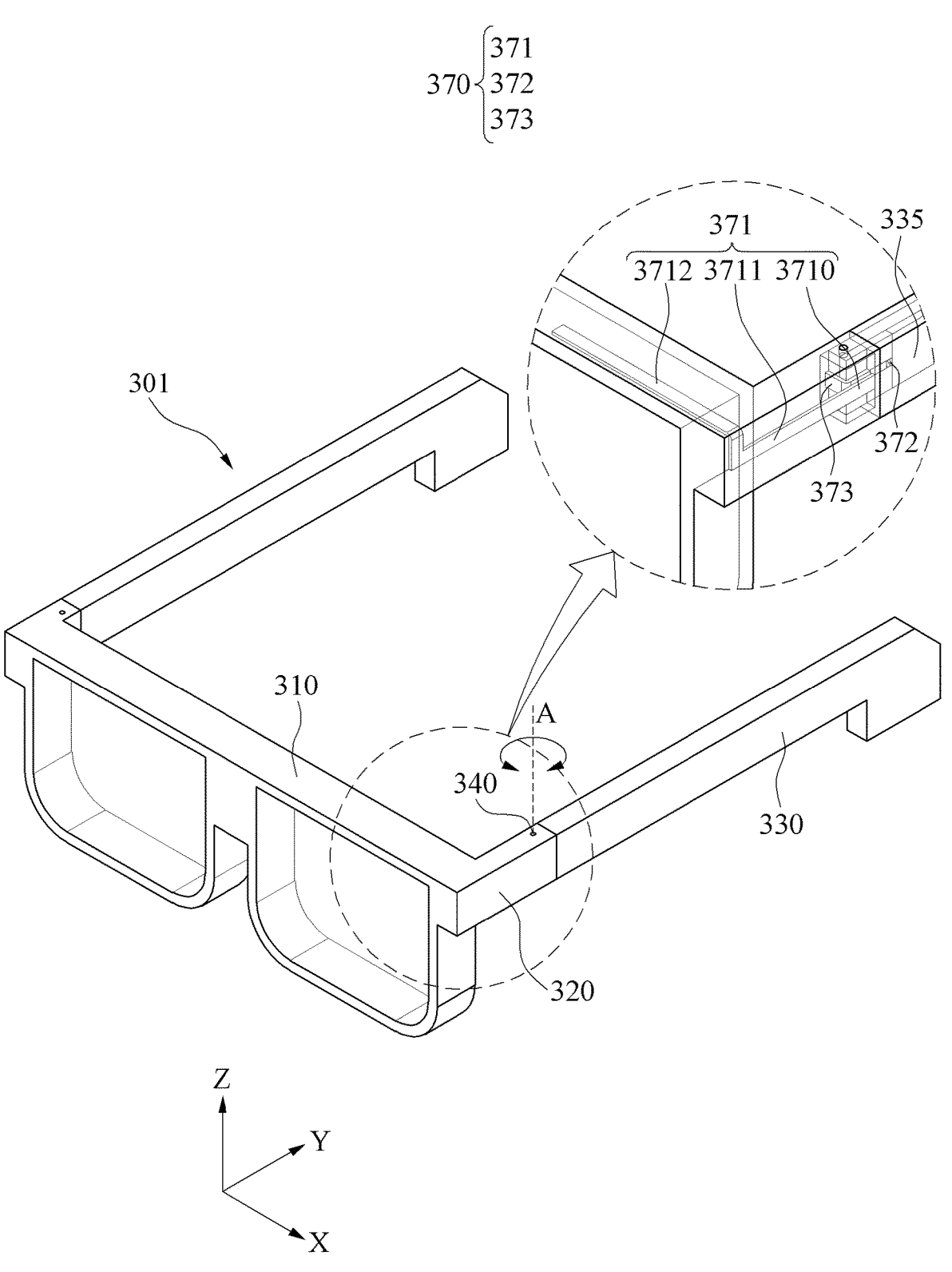
FIG. 4A is a perspective view illustrating an antenna structure of a wearable electronic device according to various embodiments.
Figure 4B:
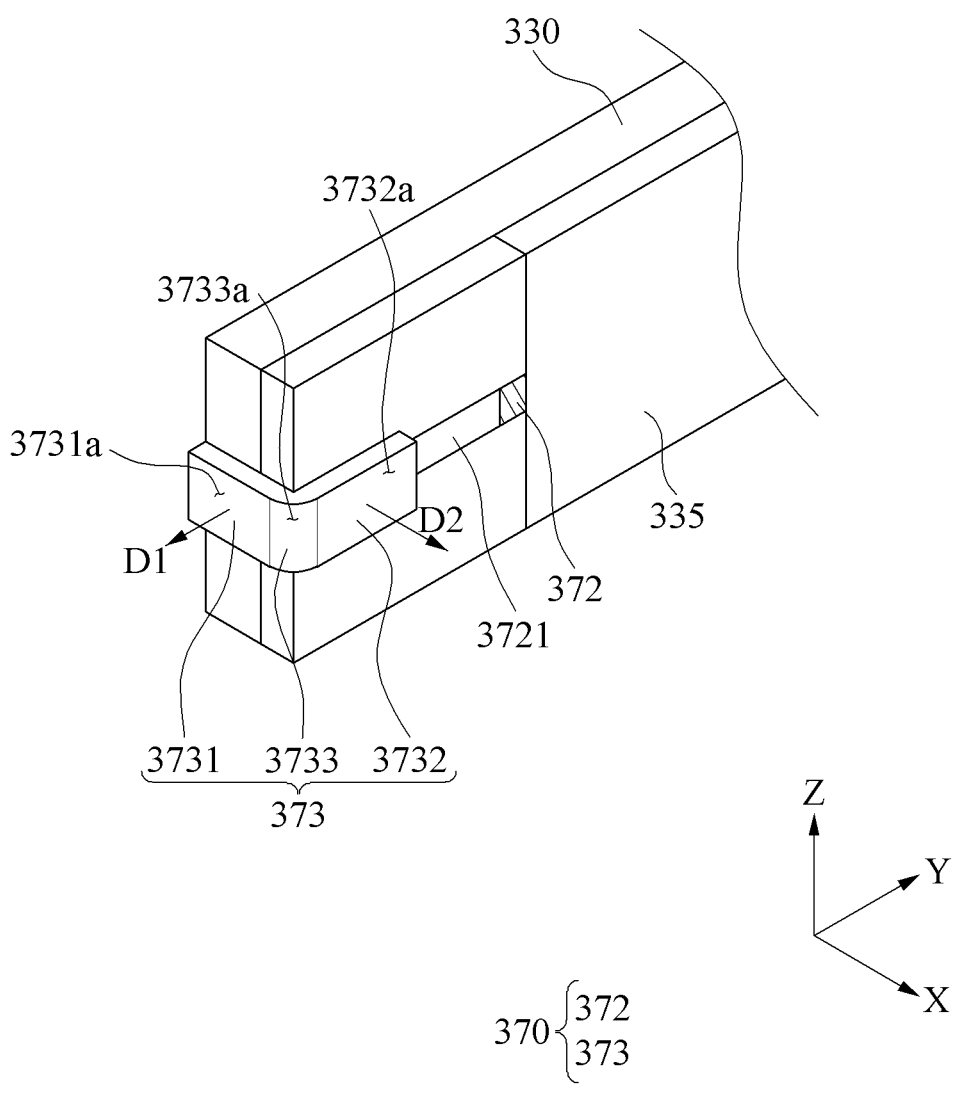
FIG. 4B is a partial perspective view illustrating the antenna structure of the wearable electronic device shown in FIG. 4A according to various embodiments.
Figure 5A:
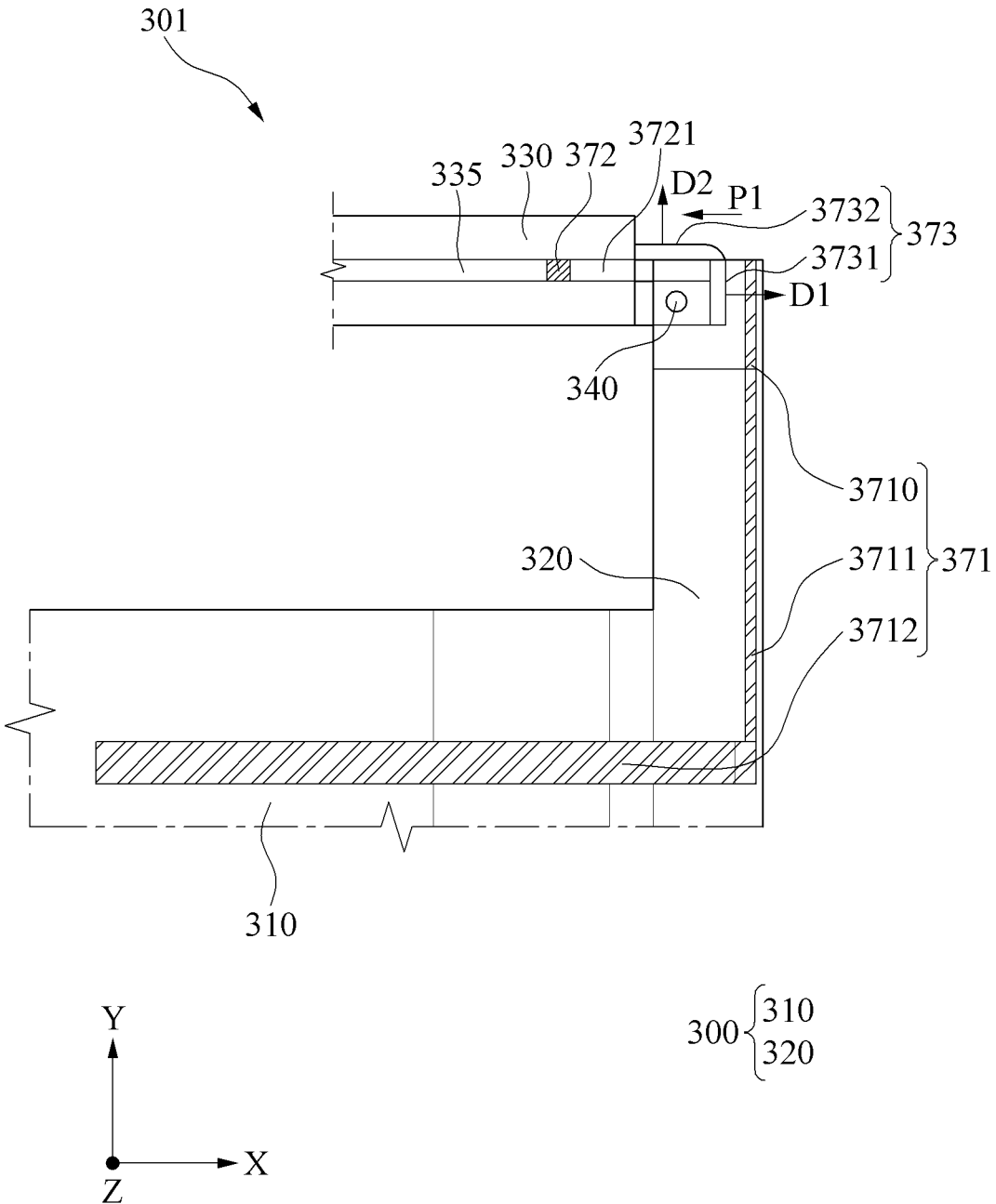
FIGS. 5A and 5B are diagrams illustrating partial plan views respectively illustrating arrangement states of an antenna structure in a first state and a second state of a wearable electronic device according to various embodiments
Figure 5B:
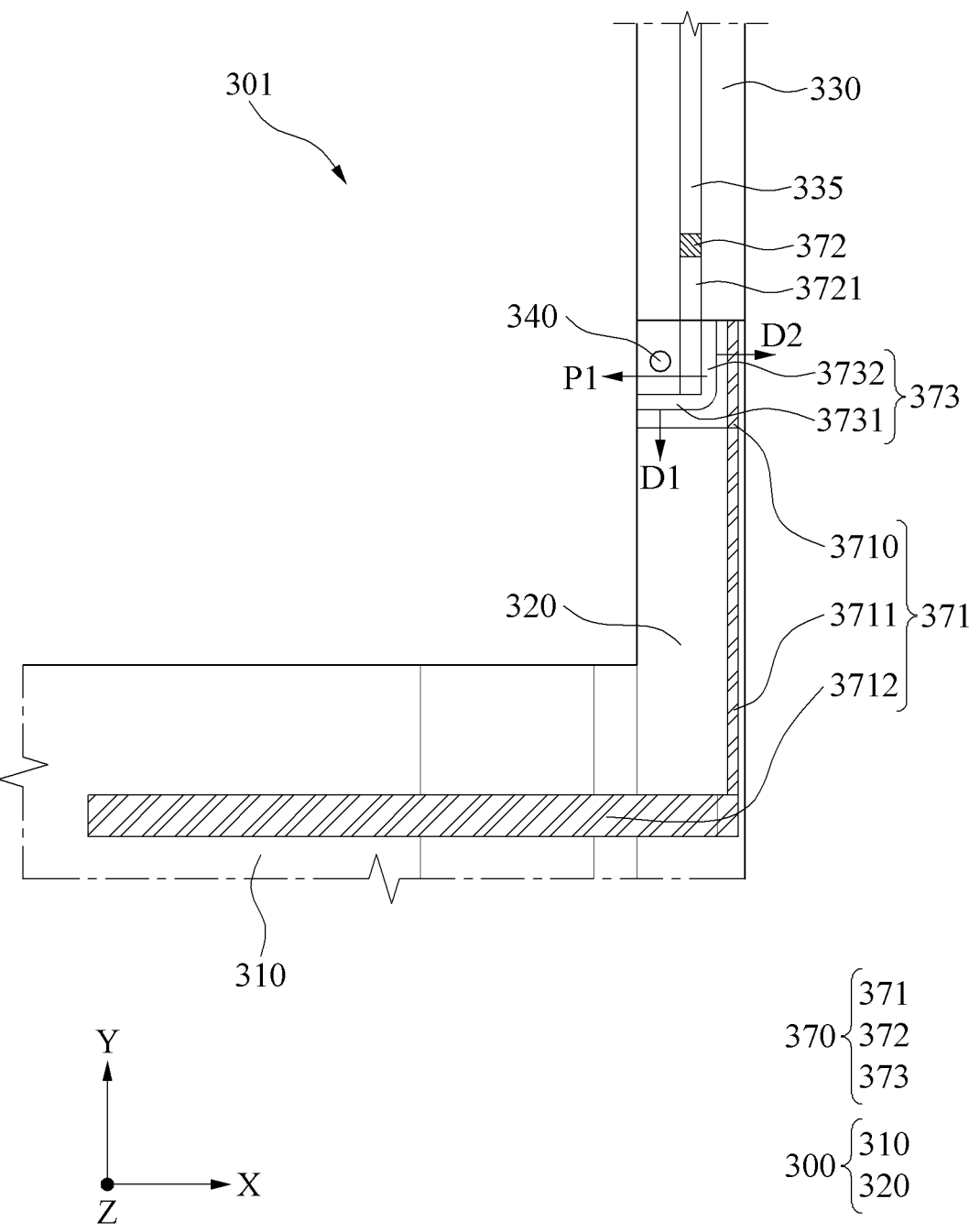
Figure 5C:
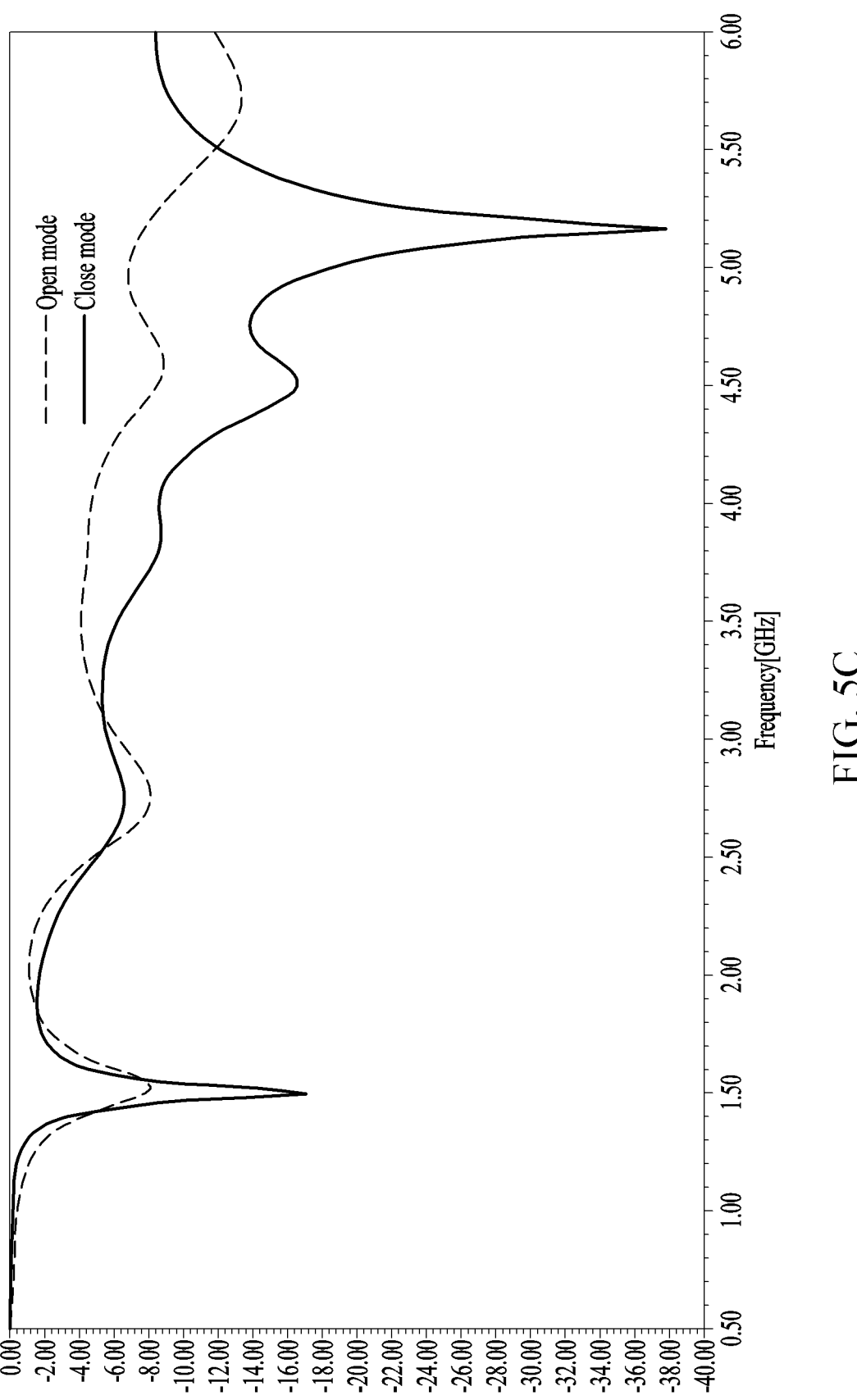
FIG. 5C is a graph showing antenna performance in each state of a wearable electronic device according to various embodiments.

FIGS. 3A and 3B are perspective views respectively illustrating a first state and a second state of a wearable electronic device according to various embodiments, FIG. 4A is a perspective view illustrating an antenna structure of a wearable electronic device according to various embodiments, FIG. 4B is a partial perspective view illustrating the antenna structure of the wearable electronic device shown in FIG. 4A according to various embodiments, FIGS. 5A and 5B are diagrams illustrating partial plan views respectively illustrating arrangement states of an antenna structure in a first state and a second state of a wearable electronic device according to various embodiments, and FIG. 5C is a graph showing antenna performance in each state of a wearable electronic device according to various embodiments.

Referring to FIGS. 3A and 3B, a wearable electronic device 301 (e.g., the electronic device 101 of FIG. 1 or the wearable electronic device 201 of FIG. 2) according to an embodiment may be worn on a body of a user, for example, a head of a user. The wearable electronic device 301 may include components for performing various functions, for example, the components of the wearable electronic device 201 shown in FIG. 2. In an embodiment, the wearable electronic device 301 may include a front frame 300 (e.g., the frames 272a and 272b of FIG. 2), and a temple 330 (e.g., the temples 271a and 271b of FIG. 2) and a hinge 340 (e.g., the hinges 240a and 240b of FIG. 2) connected to the front frame 300.

In an embodiment, the front frame 300 may include a lens frame 310 in which a lens 325 is accommodated, and a connection frame 320 extending from the lens frame 310.

In an embodiment, the lens frame 310 may be positioned at a position corresponding to an eye of a user while the wearable electronic device 301 is worn on a body of the user. In an embodiment, the lens frame 310 may have a longitudinal direction (e.g., an X-axis direction of FIG. 3A) crossing both eyes of a user. In an embodiment, at least one lens 325 may be accommodated in the lens frame 310. At least one lens 325 may be disposed at a position to cover an eye of a user while the wearable electronic device 301 is worn by the user.

In an embodiment, the connection frame 320 (e.g., the connection frames 274a and 274b of FIG. 2) may extend in one direction (e.g., a +Y-axis direction of FIG. 3A) from an end portion of the lens frame 310 in a longitudinal direction (e.g., the X-axis direction of FIG. 3A). The connection frame 320 is shown as extending in a direction orthogonal to the longitudinal direction of the lens frame 310, however, this is an example for convenience of description, and the extending direction of the connection frame 320 with respect to the longitudinal direction of the lens frame 310 is not limited thereto. For example, the connection frame 320 may extend in a direction forming a predetermined angle (e.g., 80 degrees to 110 degrees) with respect to the longitudinal direction of the lens frame 310. In an embodiment, the connection frame 320 may include a first connection frame 321 and a second connection frame 322 respectively extending from both ends of the lens frame 310. For example, the first connection frame 321 may extend from a first end portion (e.g., an end portion in a +X-axis direction of FIG. 3A) of the lens frame 310, and the second connection frame 322 may extend from a second end portion (e.g., an end portion in a −X-axis direction of FIG. 3A) of the lens frame 310. In an embodiment, the connection frame 320 and the lens frame 310 may be formed as individual members and connected to each other, or may be integrally formed to form the front frame 300.

In an embodiment, the temple 330 may assist the wearable electronic device 301 to be worn on the user's body. For example, in the second state (an unfolded state) as shown in FIG. 3B, the temple 330 may be positioned on a temple of a user and at least a portion of the temple may hang over an ear of the user, and accordingly, the lens frame 310 may be positioned on an eye of the user.

In an embodiment, the temple 330 may be rotatably connected to the connection frame 320. For example, the temple 330 may be connected to an end portion of the connection frame 320 opposite to the lens frame 310. The temple 330 may include a first temple 331 rotatably connected to the first connection frame 320, and a second temple 332 rotatably connected to the second connection frame 322. In an embodiment, the temple 330 may have a longitudinal direction (e.g., the Y-axis direction of FIG. 3B) extending in one direction from a connection portion with respect to the connection frame 320. In an embodiment, the temple 330 may rotate with respect to the connection frame 320 about a rotation axis A. The temple 330 may rotate with respect to the connection frame 320 about the rotation axis A to be in the first state (e.g., a folded state of FIG. 3A) in which the temple 330 is folded to form a first angle (e.g., about −5 degrees to 10 degrees) with respect to the lens frame 310, or the second state (e.g., the unfolded state of FIG. 3B) in which the temple 330 is unfolded to form a second angle (e.g., about 80 degrees to 110 degrees) with respect to the lens frame 310, based on a state viewed in a direction of the rotation axis A. In an embodiment, the temple 330 may be in an intermediate unfolded state forming a third angle between the first angle and the second angle with respect to the lens frame 310, based on the state viewed in the direction of the rotation axis A.

In an embodiment, the hinge 340 may be disposed along the rotation axis A, and may rotatably connect the connection frame 320 and the temple 330. For example, the hinge 340 may connect the connection frame 320 and the temple 330 by at least partially penetrating in the direction of the rotation axis A. In an embodiment, the hinge 340 may include a first hinge 341 that is disposed along a first rotation axis A1 and rotatably connects the first connection frame 321 and the first temple 331, and a second hinge 342 that is disposed along a second rotation axis A2 and rotatably connects the second connection frame 322 and the second temple 332. The first rotation axis A1 of the first hinge 341 and the second rotation axis A2 of the second hinge 342 may be parallel to each other. In an embodiment, the temple 330 may rotate by the hinge 340 to be in the first state forming the first angle with respect to the lens frame 310 or the second state forming the second angle with respect to the lens frame 310.

Referring to FIGS. 4A, 4B, 5A, and 5B, the wearable electronic device 301 according to an embodiment may perform a wireless communication function. The wearable electronic device 301 according to an embodiment may include a PCB 335, and an antenna structure 370 for transmitting and receiving a radio signal. Hereinafter, an embodiment will be described based on a case where the PCB 335 and the antenna 370 are positioned in the first temple 331 and the first connection frame 321 positioned in the +X-axis direction of the wearable electronic device 301, however, the following description may also apply substantially in the same manner to a case where the PCB 335 and the antenna 370 are positioned in the second temple 332 and the second connection frame 322 positioned in the −X-axis direction of the wearable electronic device 301.

In an embodiment, the PCB 335 may be disposed in the temple 330. A processor (e.g., the processor 120 of FIG. 1) may be disposed on the PCB 335. The processor may include, for example, one or more of a CPU, an AP, an image signal processor, a sensor hub processor, or a communication processor. In an embodiment, a wireless communication circuit (e.g., the wireless communication module 192 of FIG. 1) may be disposed on the PCB 335. The wireless communication circuit may perform communication with, for example, an external device (e.g., the wearable electronic device 301 or 104 of FIG. 1). The wireless communication circuit may generate a signal to be transmitted through the antenna structure 370 or detect a signal received through the antenna structure 370.

In an embodiment, the antenna structure 370 may be electrically connected to a wireless communication circuit. In an embodiment, the antenna structure 370 may include an antenna member 371 that is disposed in the front frame 300, a coupling terminal 373 that is disposed in the temple 330 to be electrically coupled to the antenna member 371, and a feeder 372 that applies an electrical signal (e.g., an electric current) to the coupling terminal 373.

In an embodiment, the antenna member 371 may be disposed in the front frame 300. For example, at least a portion of the antenna member 371 may be disposed in the connection frame 320. In an embodiment, the antenna member 371 may include a connection portion 3710 that is disposed in the connection frame 320 to be adjacent to the rotation axis A to be coupled to the coupling terminal 373, and a first antenna portion 3711 that extends along the longitudinal direction of the connection frame 320 from the connection portion 3710. In an embodiment, the antenna member 371 may include a second antenna portion 3712 that extends from the first antenna portion 3711 to the lens frame 310. In an embodiment, the antenna member 371 may function as a radiator that transmits and receives radio signals by radiating electromagnetic waves around the front frame 300. At least a portion of the antenna member 371 may be formed of a conductive material to form an electrical path through which electrical signals flow. For example, at least a portion of the first antenna portion 3711 to be connected to the connection portion 3710 may be formed of a conductive material. In an embodiment, when the antenna member 371 includes a second antenna portion 3710 positioned in the lens frame 310, the first antenna portion 3711, and at least a portion of the second antenna portion 3712 extending from the first antenna portion 3711 may be formed of a conductive material. Depending on a length and a pattern of an electrical signal movement path formed in the antenna member 371, a radiation pattern of electromagnetic waves formed by the antenna member 371 and a frequency band of a signal to be transmitted and received may be determined.

In an embodiment, the connection portion 3710 may be disposed so that at least a portion of a surface faces the coupling terminal 373. For example, the surface of the connection portion 3710 may face a connection direction P1

(e.g., the −X-axis direction of FIG. 4A) orthogonal to the rotation axis A. In this case, the surface of the connection portion 3710 facing the connection direction P1 may face a surface of the coupling terminal 373. In an embodiment, the antenna member 371 may be electrically coupled to the coupling terminal 373 through the connection portion 3710 in a non-contact state.

In an embodiment, the coupling terminal 373 may be disposed in the temple 330. In an embodiment, the coupling terminal 373 may be disposed on an end portion of the temple 330 where the rotation axis A is positioned, for example, an end portion of the temple 330 connected to the connection frame 320. In an embodiment, the coupling terminal 373 may include a first terminal portion 3731 to be coupled to the antenna member 371 in the first state (e.g., the folded state of FIG. 3A), and a second terminal portion 3732 to be coupled to the antenna member 371 in the second state (e.g., the unfolded state of FIG. 3B). In an embodiment, the first terminal portion 3731 may form a first terminal surface 3731a directed to a first direction D1 (e.g., a −Y-axis direction based on the second state of FIG. 4A) orthogonal to the rotation axis A, and the second terminal portion 3732 may form a second terminal surface 3732a directed to a second direction D2 (e.g., the +X-axis direction based on the second state of FIG. 4A) that is orthogonal to the rotation axis A and different from the first direction D1. The first direction D1 in which the first terminal surface 3731a faces and the second direction D2 in which the second terminal surface 3732a faces may rotate relative to the rotation axis A to correspond to a rotation angle of the temple 330 with respect to the connection frame 320. For example, when the temple 330 rotates by 90 degrees about the rotation axis A (e.g., a Z axis) and operates from the first state of FIG. 5A to the second state of FIG. 5B, the first direction D1 in which the first terminal surface 3731a faces may rotate by 90 degrees about the rotation axis A from the +X-axis direction to the −Y-axis direction, and the second direction D2 in which the second terminal surface 3732a faces may rotate by 90 degrees about the rotation axis A from the +Y-axis direction to the +X-axis direction.

In an embodiment, the first terminal portion 3731 of the coupling terminal 373 may face the surface of the connection portion 3710 in the first state, and the second terminal portion 3732 may face the surface of the connection portion 3710 in the second state. For example, based on a state viewed in the connection direction PI (e.g., the −X-axis direction of FIGS. 5A and 5B), the first terminal portion 3731 may overlap the connection portion 3710 in the first state (e.g., FIG. 5A), and the second terminal portion 3732 may overlap the connection portion 3710 in the second state (e.g., FIG. 5B). In this case, an area of the first terminal portion 3731 overlapping the connection portion 3710 in the first state may be substantially the same as an area of the second terminal portion 3732 overlapping the connection portion 3710 in the second state. In an embodiment, based on the first state as shown in FIG. 5A, the first terminal surface 3731a of the first terminal portion 3731 may be parallel to the surface of the connection portion 3710. For example, the first direction D1 in which the first terminal surface 3731a faces may be parallel to the connection direction P1 in the first state. In another example, based on the second state as shown in FIG. 5B, the second terminal surface 3732a of the second terminal portion 3732 may be parallel to the surface of the connection portion 3710. For example, the second direction D2 in which the second terminal surface 3732a faces may be parallel to the connection direction P1 in the second state.

In an embodiment, the coupling terminal 373 and the antenna member 371 may be electrically coupled in a non-contact state. In an embodiment, the coupling terminal 373 may be coupled while forming a first gap with the surface of the connection portion 3710 through the first terminal portion 3731 in the first state (e.g., the first state of FIG. 5A), and may be coupled while forming a second gap with the surface of the connection portion 3710 through the second terminal portion 3732 in the second state (e.g., the second state of FIG. 5B). In an embodiment, the first gap formed between the first terminal portion 3731 and the connection portion 3710 in the first state, and the second gap formed between the second terminal portion 3732 and the connection portion 3710 in the second state may be substantially the same. In this case, the coupling performance between the coupling terminal 373 and the antenna member 371 may be maintained uniformly in the first state and the second state. In an embodiment, the first gap and the second gap may be formed to be different from each other or the same as each other, considering the overlapping area of each of the first terminal portion 3731 and the second terminal portion 3732 with respect to the connection portion 3710, such that the coupling performance between the coupling terminal 373 and the antenna member 371 is maintained uniformly in the first state and the second state.

In an embodiment, the coupling terminal 373 may include a connecting terminal portion 3733 that connects the first terminal portion 3731 and the second terminal portion 3732. The connecting terminal portion 3733 may include a connecting terminal surface 3733a formed on the surface to connect the first terminal surface 3731a and the second terminal surface 3732a. In an embodiment, when the temple 330 is positioned between the first state and the second state, for example, when an angle formed by the temple 330 with respect to the lens frame 310 is positioned between the first angle of the first state and the second angle of the second state, the connecting terminal portion 3733 may be electrically coupled to the connection portion 3710 of the antenna member 371. In this case, at least a portion of the connecting terminal surface 3733a may face the surface of the connection portion 3710.

In an embodiment, when the temple 330 is positioned between the first state and the second state, the coupling terminal 373 may form a third gap with the surface of the connection portion 3710 through at least a portion of the connecting terminal surface 3733a. In an embodiment, the third gap may be smaller than the first gap (e.g., the first gap between the first terminal portion 3731 and the connection portion 3710 in the first state of FIG. 5A) and the second gap (e.g., the second gap between the second terminal portion 3732 and the connection portion 3710 in the second state of FIG. 5B). In an embodiment, the third gap may be substantially the same as the first gap or the second gap.

In an embodiment, when the temple 330 is positioned between the first state and the second state, the third gap may be a minimum distance between the coupling terminal 373 and the connection portion 3710. In an embodiment, a portion of the connecting terminal surface 3733a forming a third distance with respect to the surface of the connection portion 3710 may change in response to the rotation angle of the temple 330 with respect to the lens frame 310, based on a cross section orthogonal to the rotation axis A. For example, the portion of the connecting terminal surface 3733a forming the third distance with respect to the surface of the connection portion 3710 may change from a portion adjacent to the first terminal surface 3731a to a portion adjacent to the second terminal surface 3732a, as the temple 330 operates from the first state (e.g., the first state of FIG. 5A) to the second state (e.g., the second state of FIG. 5B).

In an embodiment, the connecting terminal surface 3733a formed by the connecting terminal portion 3733 may form a curved surface connected to the first terminal surface 3731a and the second terminal surface 3732a. For example, based on a cross section orthogonal to the rotation axis A, the connecting terminal surface 3733a may form an arc shape centered on the rotation axis A. In an embodiment, when the angle formed by the temple 330 with respect to the lens frame 310 changes between the first angle of the first state (e.g., the first state of FIG. 5A) and the second angle of the second state (e.g., the second state of FIG. 5B), a minimum distance of the connecting terminal surface 3733a separated from the surface of the connection portion 3710 may be substantially uniformly maintained. In this case, during a process in which the temple 330 rotates with respect to the lens frame 310, the coupling performance between the connecting terminal portion 3733 and the antenna member 371 may be uniformly maintained.

In an embodiment, the feeder 372 may apply an electrical signal to the antenna member 371 through the coupling terminal 373. In an embodiment, the feeder 372 may be connected to a wireless communication circuit disposed on a PCB. The feeder 372 may transmit a feed signal to the coupling terminal 373 through a feed line 3721, and the feed signal transmitted to the coupling terminal 373 may be transmitted to the antenna member 371.

In an embodiment, as the antenna structure 370 changes the coupling portion of the coupling terminal 373 with respect to the antenna member 371 in response to the rotational motion of the temple 330, specified antenna radiation performance may be secured without interference with a rotation state of the temple 330 with respect to the front frame 300.

Referring to FIG. 5C, since the wearable electronic device 301 has resonance performance capable of securing sufficient antenna performance in both close mode (e.g., the first state of FIG. 5A) and open mode (e.g., the second state of FIG. 5B) through the antenna structure 370, it may be confirmed that a radiation function in a set frequency range may be implemented.

Figure 6A:
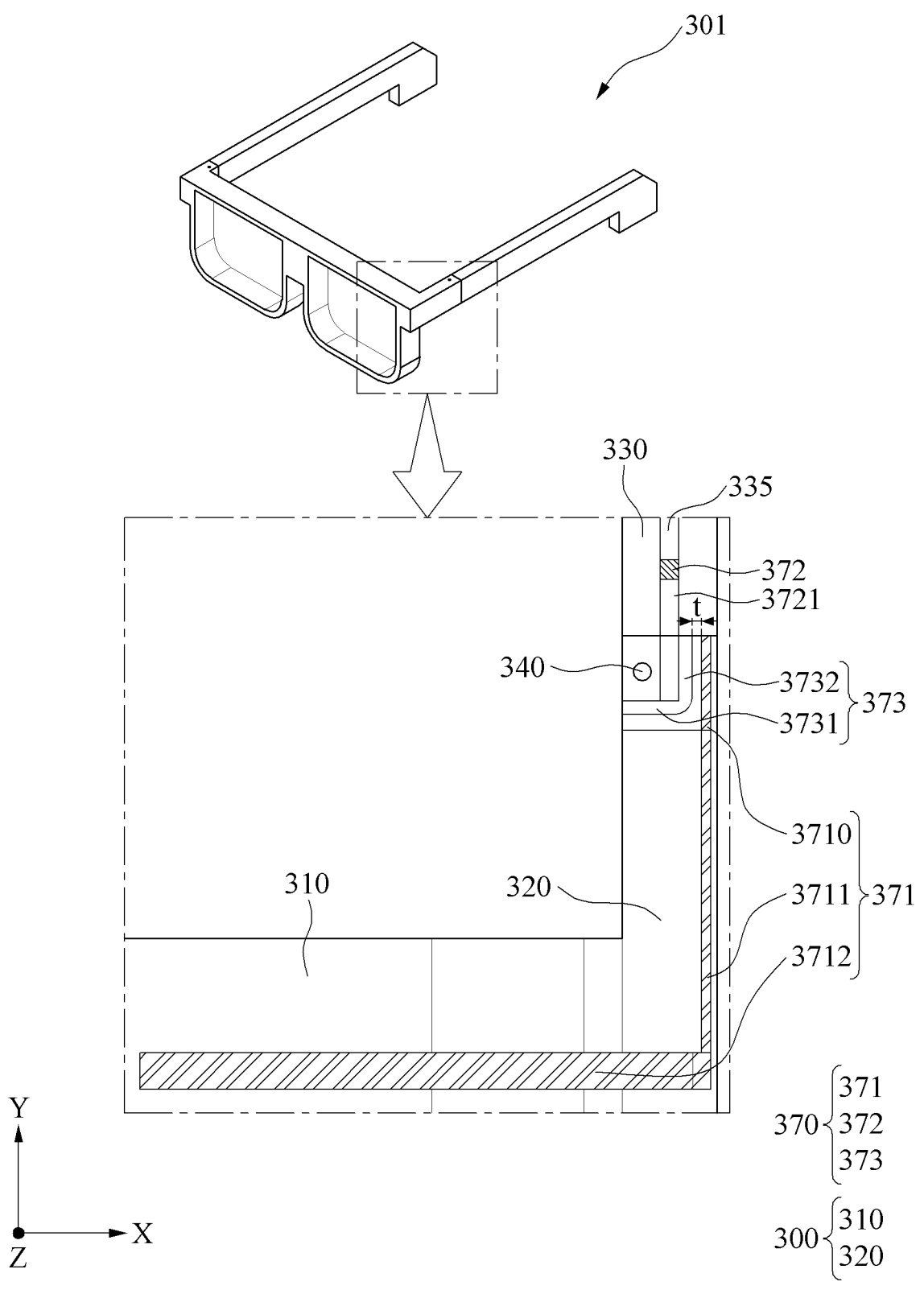
FIG. 6A is a diagram including a perspective and partial plan view illustrating an arrangement relationship of an antenna structure in a wearable electronic device according to various embodiments.
Figure 6B:
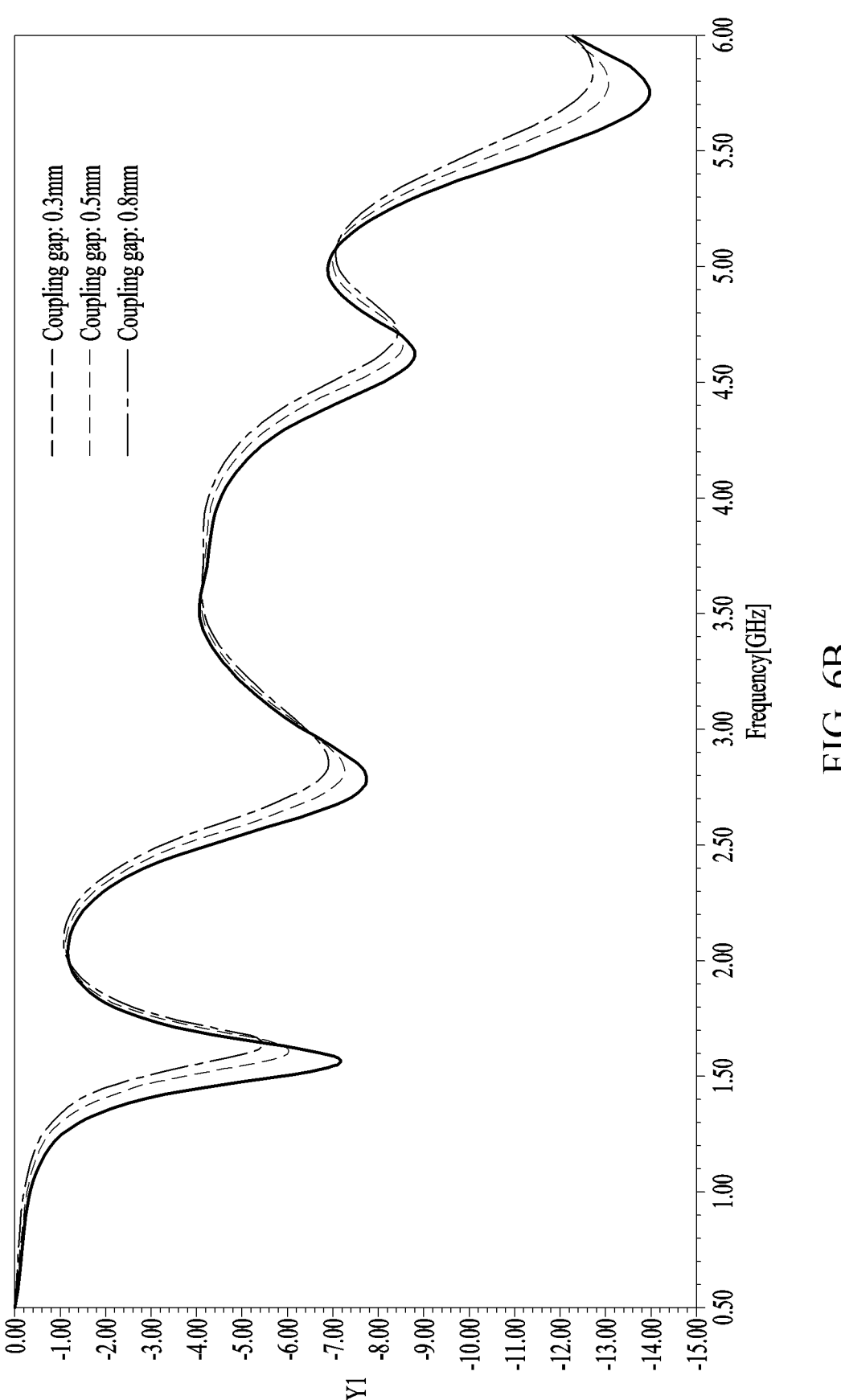
FIG. 6B is a graph showing antenna radiation performance according to a gap between an antenna and a coupling terminal according to various embodiments.

FIG. 6A is a diagram including a perspective and partial plan view illustrating an arrangement relationship of an antenna structure in a wearable electronic device according to various embodiments, and FIG. 6B is a graph showing antenna radiation performance according to a gap between an antenna member and a coupling terminal according to various embodiments.

Referring to FIG. 6A, an operation of the antenna structure 370 in the wearable electronic device 301 will be described. In the antenna structure 370 of the wearable electronic device 301 according to an embodiment, the PCB 335 on which a wireless communication circuit is disposed may be disposed in the temple 330, and the antenna member 371 forming a radiation pattern may be disposed on the front frame 300. In an embodiment, when the wireless communication circuit applies an electrical signal through the feeder 372, the applied electrical signal may be transmitted to the coupling terminal 373 positioned on the end portion of the temple 330 adjacent to the hinge 340 through the feed line 3721. In an embodiment, the antenna member 371 may be coupled in a non-contact state to the coupling terminal 373 through the connection portion 3710 disposed so that the surface faces the coupling terminal 373, to receive the electrical signal applied by the feeder 372. In an embodiment, the electrical signal applied to the antenna member 371 may form an electromagnetic wave in a frequency band corresponding to a resonance length while moving along the first antenna portion 3711 or the second antenna portion 3712. Accordingly, the antenna structure 370 may transmit and receive a radio signal through a portion of the connection frame 320 or the lens frame 310.

In an embodiment, the coupling terminal 373 may include a first terminal portion 3731 to be coupled to the connection portion 3710 of the antenna member 371 in the first state, and a second terminal portion 3732 to be coupled to the connection portion 3710 of the antenna member 371 in the second state. In an embodiment, the antenna member 371 may be coupled to the coupling terminal 373 in a separate state and transmit power thereto. Based on the second state as shown in FIG. 6A, the connection portion 3710 of the antenna member 371 may be spaced apart by a distance t at which the coupling may be stably performed without interfering with the rotational motion the temple 330.

FIG. 6B shows a resonant frequency of the antenna structure 370 in the second state of the wearable electronic device 301 shown in FIG. 6A. Referring to the graph of FIG. 6B, when the gap t between the connection portion 3710 and the coupling terminal 373 is reduced from 0.5 mm to 0.3 mm or increased to 0.8 mm, a deviation of the resonant frequency according to each gap appears within a range of about 10 Mhz and it may be confirmed that the antenna structure 370 resonates in a similar frequency band. Therefore, even considering the deviation of a feeding interval due to manufacturing tolerances, sufficiently stable antenna performance may be secured.

Figure 7A:
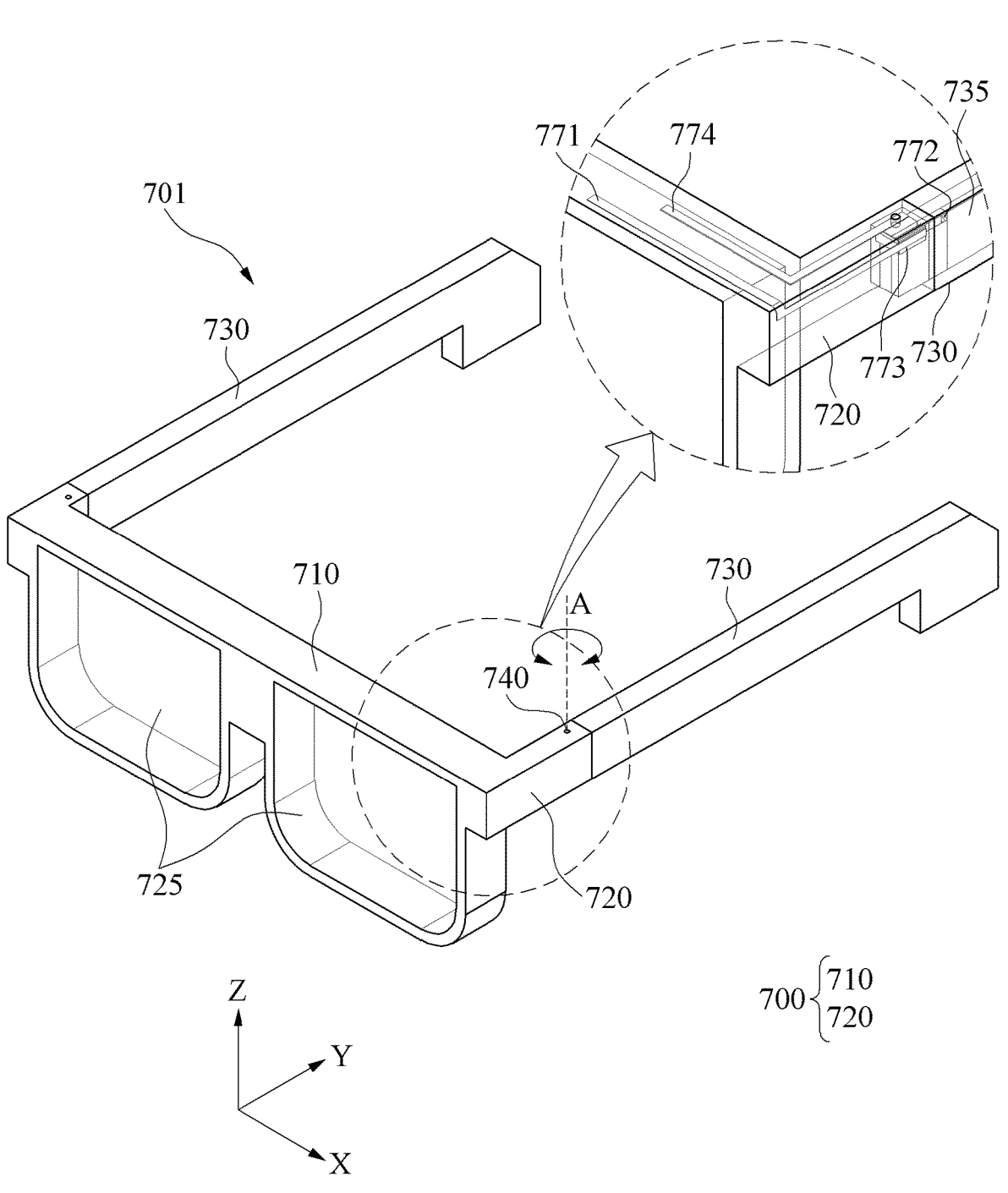
FIG. 7A is a perspective view illustrating a wearable electronic device according to various embodiments.
Figure 7B:
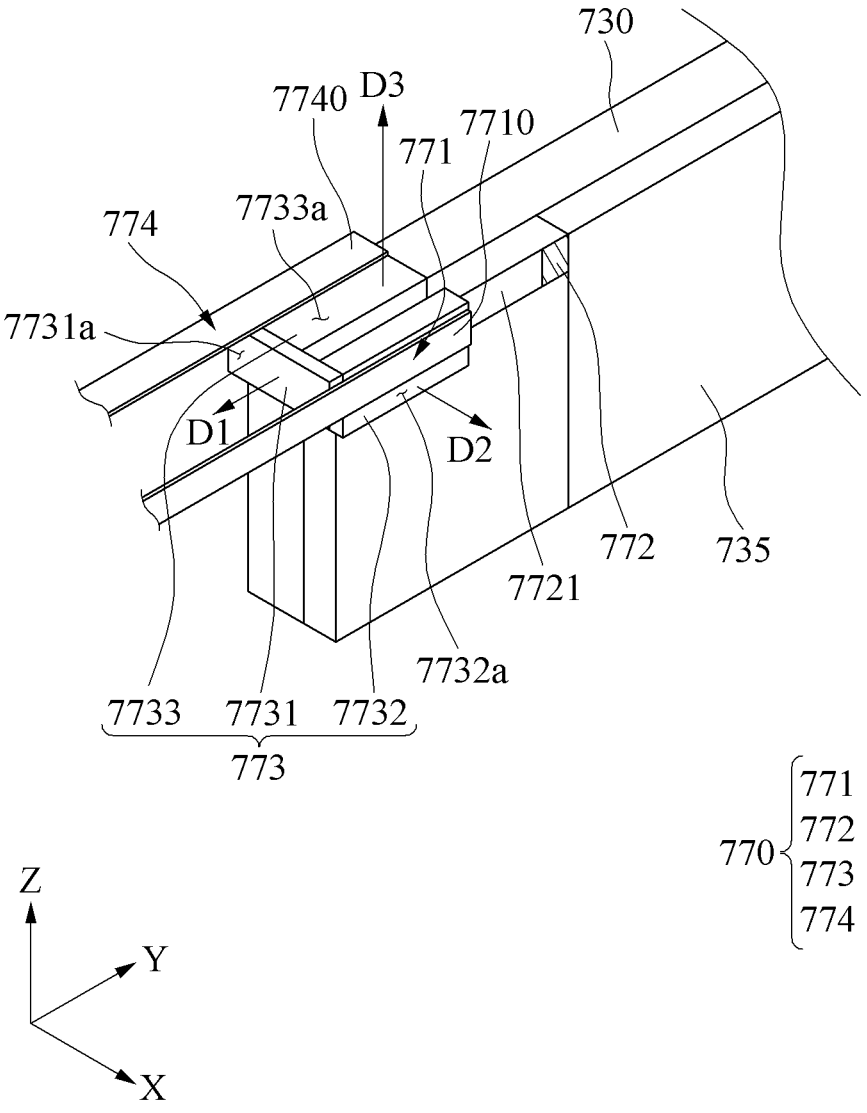
FIG. 7B is a partial perspective view illustrating an antenna structure of the wearable electronic device shown in FIG. 7A according to various embodiments.

FIG. 7A is a front perspective view illustrating an example wearable electronic device according to various embodiments, and FIG. 7B is a partial perspective view illustrating an antenna structure of the wearable electronic device shown in FIG. 7A according to various embodiments.

Referring to FIGS. 7A and 7B, a wearable electronic device 701 (e.g., the electronic device 101 of FIG. 1 or the electronic device 201 of FIG. 2) according to an embodiment may include a front frame 700 (e.g., the front frame 272a and 272b of FIG. 2 or the front frame 300 of FIG. 4A), a temple 730 (e.g., the temple 271a and 272b of FIG. 2, or the temple 330 of FIG. 4A), a hinge 740 (e.g., the hinges 240a and 240b of FIG. 2, or the hinge 340 of FIG. 4A), a PCB 735 (e.g., the PCB 335 of FIG. 4A), and an antenna structure 770.

In an embodiment, the front frame 700 may include a lens frame 710 in which a lens 725 is accommodated, and a connection frame 720 extending from the lens frame 710. In an embodiment, the temple 730 may be rotatably connected to the connection frame 720 about the rotation axis A. In an embodiment, the hinge 740 may rotatably connect the connection frame 720 and the temple 730 along the rotation axis A, and rotate the temple 730 such that the temple 730 is in a first state (e.g., the first state of FIG. 3A) folded to form a first angle with respect to the lens frame 710 or a second state (e.g., the second state of FIG. 7A) unfolded to form a second angle with respect to the lens frame 710.

In an embodiment, the PCB 735 may be disposed in the temple 730. A wireless communication circuit (e.g., the wireless communication module 192 of FIG. 1) may be disposed on the PCB. In an embodiment, the antenna structure 770 may be electrically connected to a wireless communication circuit.

In an embodiment, the antenna structure 770 may include a coupling terminal 773, a feeder 772 for applying an electrical signal to the coupling terminal 773, a first antenna member 771, and a second antenna member 774.

In an embodiment, the coupling terminal 773 and the feeder 772 may be disposed on the temple 730. In an embodiment, the coupling terminal 773 may be disposed on an end portion of the temple 730 adjacent to the hinge 740. The feeder 772 may be connected to a wireless communication circuit, and may be electrically connected to the coupling terminal 773 through a feed line 7721. In an embodiment, the first antenna member 771 and the second antenna member 774 may be disposed on the front frame 700, and coupled to the coupling terminal 773 to receive an electrical signal applied through the feeder 772.

In an embodiment, at least a portion of each of the first antenna member 771 and the second antenna member 774 may be disposed on the connection frame 720. The first antenna member 771 and the second antenna member 774 may function as radiators that transmit and receive radio signals. In an embodiment, the first antenna member 771 and the second antenna member 774 may include a conductive portion that forms a movement path for electrical signals. In an embodiment, the first antenna member 771 and the second antenna member 774 may each transmit and receive a radio signal corresponding to a resonance frequency according to the movement path of the electric signal. In an embodiment, the first antenna member 771 and the second antenna member 774 may transmit and receive radio signals at different frequencies. For example, the first antenna member 771 and the second antenna member 774 may be formed to have different lengths or may form movement paths of electrical signals with different lengths.

In an embodiment, the first antenna member 771 may be electrically coupled to the coupling terminal 773 through a first connection portion 7710, and the second antenna member 774 may be electrically coupled to the coupling terminal 773 through a second connection portion 7740. The first connection portion 7710 and the second connection portion 7740 may be coupled to different portions of the coupling terminal 773, respectively, and may respectively receive electrical signals applied to the coupling terminal 773.

In an embodiment, the coupling terminal 773 may be disposed on the temple 730. In an embodiment, the coupling terminal 773 may include a first terminal portion 7731 to be coupled to the first antenna member 771 in the first state (e.g., the first state of FIG. 3A), a second terminal portion 7732 to be coupled to the first antenna member 771 in the second state (e.g., the second state of FIG. 7B), and a third terminal portion 7733 to be coupled to the second antenna member 774.

In an embodiment, the coupling terminal 773 may be selectively coupled to the first connection portion 7710 of the first antenna member 771 through the first terminal portion 7731 and the second terminal portion 7732 according to the rotational motion of the temple 730. In an embodiment, the first terminal portion 7731 may include a first terminal surface 7731a facing a first direction D1 (e.g., a −Y-axis direction of FIG. 7A) orthogonal to the rotation axis A. The first terminal surface 7731a may face a surface of the first connection portion 7710 in a non-contact state in the first state. In this case, for example, the first terminal surface 7731a and the first connection portion 7710 may be parallel in the first state. In an embodiment, the second terminal portion 7732 may include a second terminal surface 7732a facing a second direction D2 (e.g., a +X-axis direction of FIG. 7A) that is orthogonal to the rotation axis A and different from the first direction D1. The second terminal surface 7732a may face a surface of the first connection portion 7710 in a non-contact state in the second state. In the second state, the second terminal surface 7732a may be parallel to the surface of the first connection portion 7710.

In an embodiment, the third terminal portion 7733 may include a third terminal surface 7733a facing a third direction D3 (e.g., a +Z-axis direction of FIG. 7A) parallel to the rotation axis A. For example, the third direction D3 may be orthogonal to the first direction D1 and the second direction D2. In an embodiment, the third terminal surface 7733a may face a surface of the second connection portion 7740 in a non-contact state. In an embodiment, the third terminal portion 7733 may be electrically coupled to the second antenna member 774 regardless of the rotational motion of the temple 730. For example, when viewed in the third direction D3, the third terminal surface 7733a may overlap at least a portion of the second connection portion 7740. In an embodiment, the surfaces of the third terminal surface 7733a and the second connection portion 7740 may be parallel to each other. In this case, regardless of the rotational motion of the temple 730, a gap between the third terminal portion 7733 and the second connection portion 7740 and an overlapping area when viewed in the third direction D3 are substantially maintained to be constant, thereby securing constant coupling performance, for example, uniform power feeding performance.

Figure 8A:
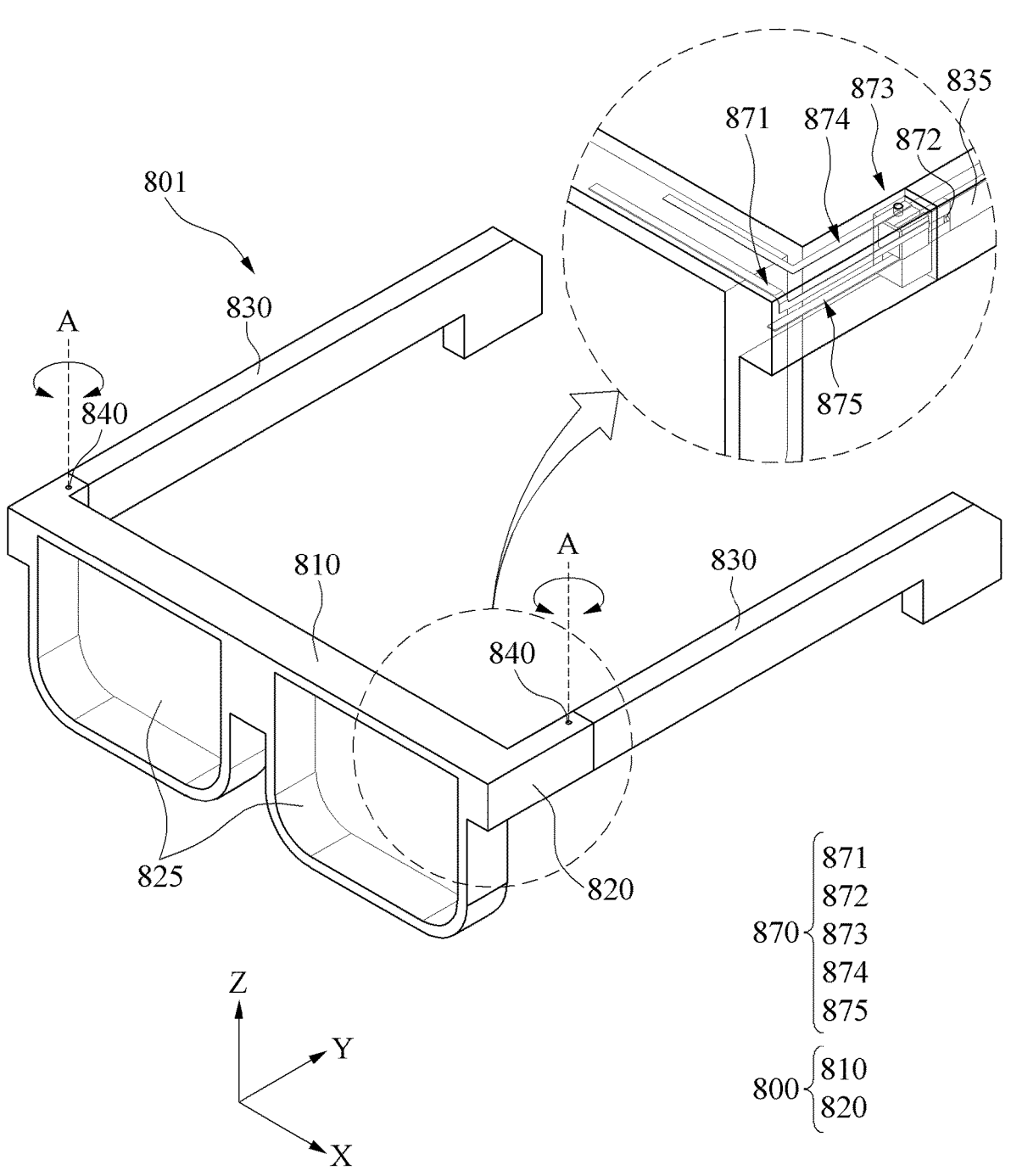
FIG. 8A is a perspective view illustrating a wearable electronic device according to various embodiments.
Figure 8B:
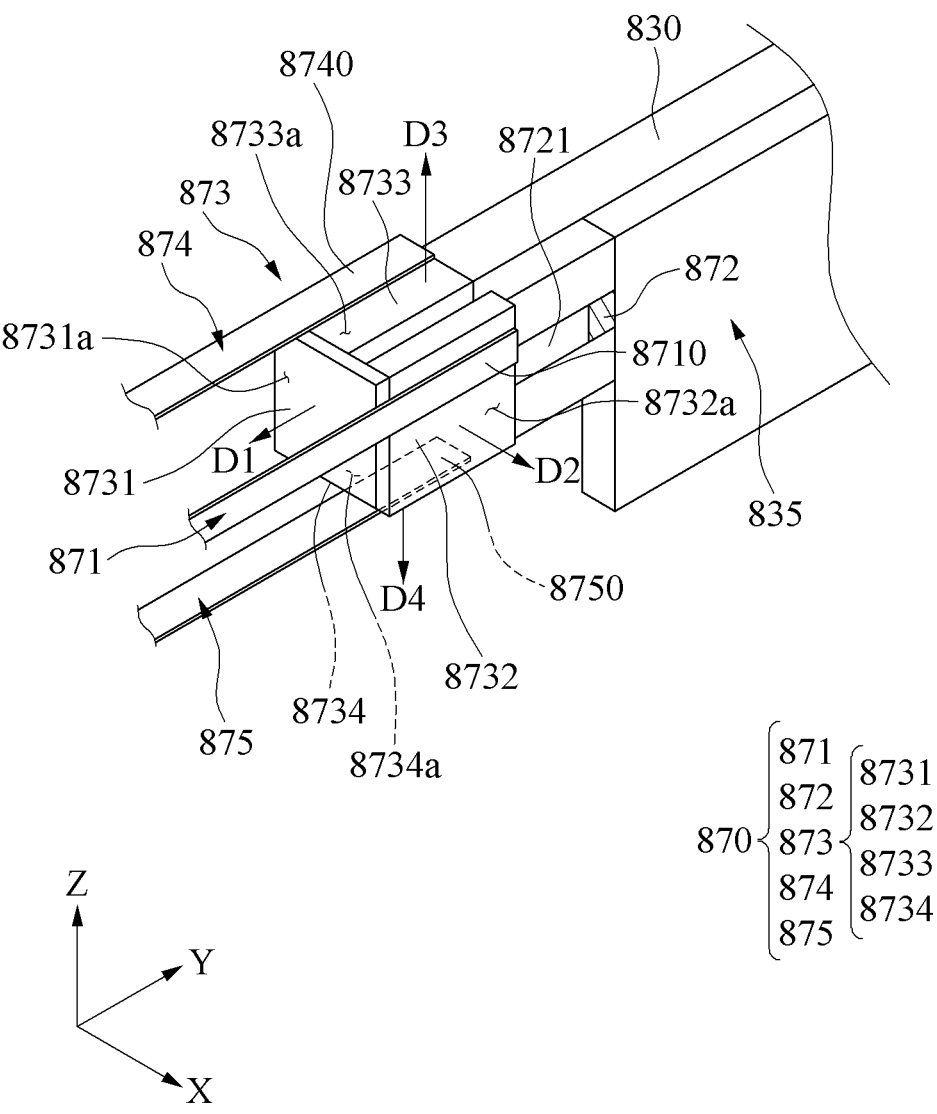
FIG. 8B is a partial perspective view illustrating an antenna structure according to various embodiments.
Figure 8C:
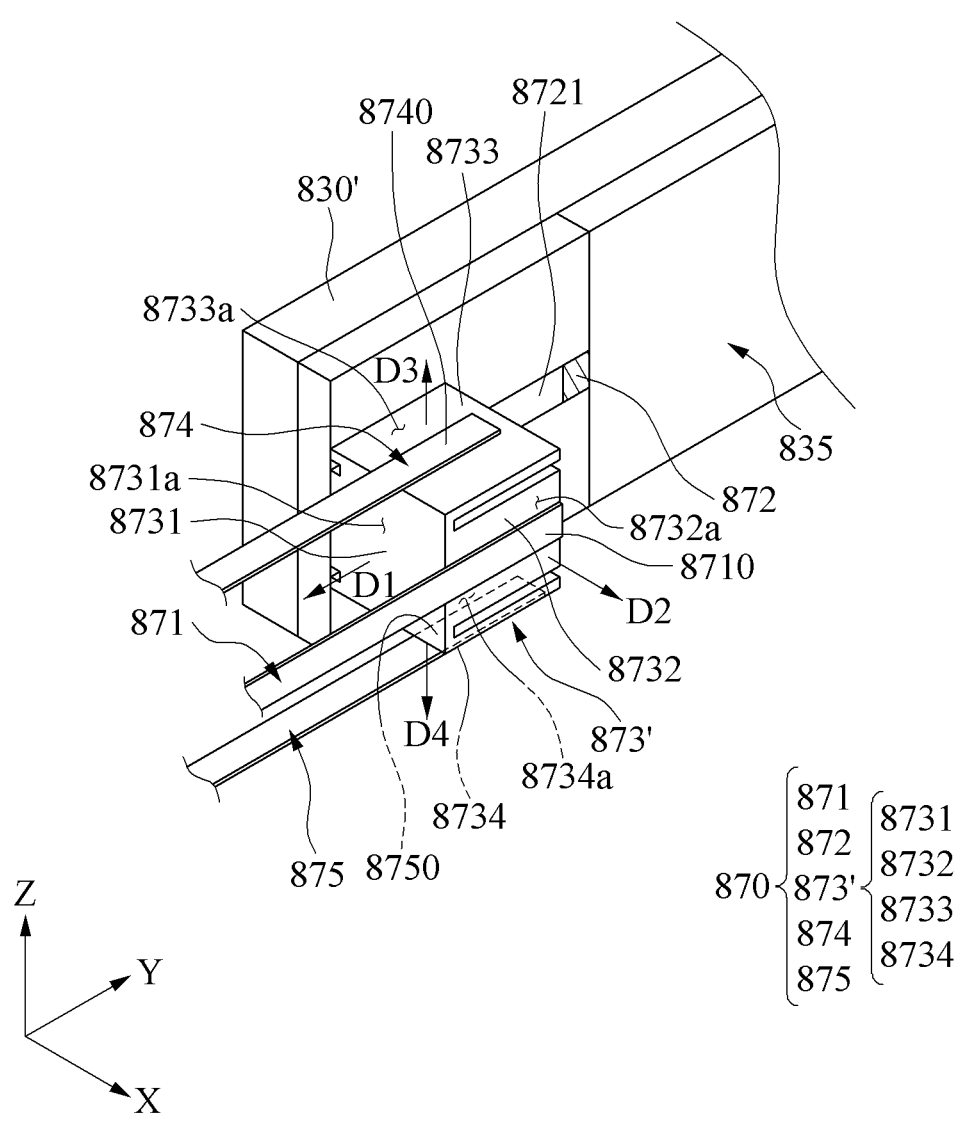
FIG. 8C is a partial perspective view illustrating an antenna structure according to various embodiments.

FIG. 8A is a front perspective view illustrating an example wearable electronic device according to various embodiments, FIG. 8B is a partial perspective view illustrating an antenna structure according to various embodiments, and FIG. 8C is a partial perspective view illustrating an antenna structure according to various embodiments.

Referring to FIGS. 8A, 8B and 8C (which may be referred to as FIGS. 8A to 8C), a wearable electronic device 801 according to an embodiment may include a front frame 800 (e.g., the front frame 272a and 272b of FIG. 2, the front frame 300 of FIG. 4A, or the front frame 700 of FIG. 7A), a temple 830 (e.g., the temples 271a and 271b of FIG. 2, the temple 330 of FIG. 4A, or the temple 730 of FIG. 7A), a hinge 840 (e.g., the hinges 240a and 240b of FIG. 2, the hinge 340 of FIG. 4A, or the hinge 740 of FIG. 7A), a PCB 835 (e.g., the PCB 335 of FIG. 4A or the PCB 735 of FIG. 7A), and an antenna structure 870.

In an embodiment, the front frame 800 may include a lens frame 810 in which a lens 825 is accommodated, and a connection frame 820 extending from the lens frame 810. In an embodiment, the temple 830 may be rotatably connected to the connection frame 820 about the rotation axis A. In an embodiment, the hinge 840 may rotatably connect the connection frame 820 and the temple 830 along the rotation axis A, and rotate the temple 830 such that the temple 830 is in a first state (e.g., the first state of FIG. 3A) folded to form a first angle with respect to the lens frame 810 or a second state (e.g., the second state of FIG. 8A) unfolded to form a second angle with respect to the lens frame 810.

In an embodiment, the PCB 835 may be disposed in the temple 830. A wireless communication circuit (e.g., the wireless communication module 192 of FIG. 1) may be disposed on the PCB 835. In an embodiment, the antenna structure 870 may be electrically connected to a wireless communication circuit. In an embodiment, the antenna structure 870 may include a coupling terminal 873, a feeder 872 for applying an electrical signal to the coupling terminal 873, a first antenna member 871, a second antenna member 874, and a third antenna member 875.

In an embodiment, the coupling terminal 873 and the feeder 872 may be disposed on the temple 830. In an embodiment, the coupling terminal 873 may be disposed on an end portion of the temple 830 adjacent to the hinge 840.

The feeder 872 may be connected to a wireless communication circuit, and may be electrically connected to the coupling terminal 873 through a feed line 8721. In an embodiment, the first antenna member 871, the second antenna member 874, and the third antenna member 875 each may be disposed on the front frame 800 and may be coupled to the coupling terminal 873. In an embodiment, a radio signal in a frequency band corresponding to a resonance length of an electrical signal flowing through each of the first antenna member 871, the second antenna member 874, and the third antenna member 875 may be transmitted and received.

In an embodiment, each antenna member may transmit and receive radio signals in different frequency bands. For example, the first antenna member 871 may have a length different from a length of at least one of the second antenna member 874 and the third antenna member 875.

In an embodiment, the first antenna member 871 may be disposed to face the coupling terminal 873 through a first connection portion 8710, the second antenna member 874 may be disposed to face the coupling terminal 873 through a second connection portion 8740, and the third antenna member 875 may be disposed to face the coupling terminal 873 through a third connection portion 8750. In this case, the connection portions 8710, 8740, and 8750 of the respective antenna members 871, 874, and 875 may receive electrical signals through different portions of the coupling terminal 873.

In an embodiment, the coupling terminal 873 may be disposed on the temple 830. In an embodiment, the coupling terminal 873 may be disposed on an end portion of the temple 830 where the hinge 840 is disposed, for example, on an end portion of the temple 830 adjacent to the connection frame 820. In an embodiment, the coupling terminal 873 may include a first terminal portion 8731 on which a first terminal surface 8731a directed to a first direction D1 (e.g., a −Y-axis direction of FIG. 8B) orthogonal to a rotation axis A (e.g., an axis parallel to a Z-axis of FIG. 8B) is formed, a second terminal portion 8732 on which a second terminal surface 8732a directed to a second direction D2 (e.g., a +X-axis direction of FIG. 8B) orthogonal to the rotation axis A and different from the first direction D1 is formed, a third terminal portion 8733 on which a third terminal surface 8733a directed to a third direction D3 (e.g., a +Z-axis direction of FIG. 8B) parallel to the rotation axis A is formed, and a fourth terminal portion 8734 on which a fourth terminal surface 8734a directed to a fourth direction D4 (e.g., −Z-axis direction of FIG. 8B) opposite to the third direction D3 is formed.

In an embodiment, the first terminal portion 8731 and the second terminal portion 8732 may be selectively coupled to the first antenna member 871 according to the rotational motion of the temple 830. In an embodiment, the first terminal portion 8731 may be coupled to the first antenna member 871 in a first state (e.g., the first state of FIG. 3A). For example, the first terminal surface 8731a may face the surface of the first connection portion 8710 in a non-contact state in parallel in the first state. In an embodiment, the second terminal portion 8732 may be coupled to the first antenna member 871 in a second state (e.g., the second state of FIG. 8A). For example, the second terminal surface 8732a may face the surface of the first connection portion 8710 in a non-contact state in parallel in the second state.

In an embodiment, the third terminal portion 8733 may be coupled to the second antenna member 874. In an embodiment, the third terminal portion 8733 may face the surface of the second connection portion 8740 in a non-contact state in parallel through the third terminal surface 8733a regardless of the rotational motion of the temple 830. In this case, the third terminal surface 8733a is orthogonal to the rotation axis A, and accordingly, a gap between the third terminal portion 8733 and the second connection portion 8740 and an overlapping area when viewed in the third direction D3 may be maintained to be constant, and the coupling performance between the third terminal portion 8733 and the second antenna member 874 may be maintained uniformly.

In an embodiment, the fourth terminal portion 8734 may be coupled to the third antenna member 875. In an embodiment, the fourth terminal portion 8734 may face the surface of the third connection portion 8750 in a non-contact state in parallel through the fourth terminal surface 8734a regardless of the rotational motion of the temple 830. In this case, a gap between the fourth terminal portion 8734 and the third connection portion 8753 and an overlapping area when viewed in the fourth direction D4 may be maintained constant, and the coupling performance between the fourth terminal portion 8734 and the third antenna member 875 may be maintained uniformly.

In an embodiment, the coupling terminal 873 may be formed in a rectangular parallelepiped shape including the first terminal surface 8731a, the second terminal surface 8732a, the third terminal surface 8733a, and the fourth terminal surface 8734a. In this case, the coupling terminal 873 may be connected to an end portion of the temple 830 such that each terminal surface is exposed. For example, as shown in FIG. 8B, the temple 830 may be formed to have an end portion with a narrowed width to be connected to the coupling terminal 873 by fitting inward. In another example, as shown in FIG. 8C, a coupling terminal 873' may be connected by being attached to an end portion surface (e.g., an end portion surface directed to the +X-axis direction) of a temple 830' such that each terminal surface is exposed.

A wearable electronic device according to an example embodiment may include: a front frame including a lens frame configured to accommodate a lens, and a connection frame extending from the lens frame, a temple rotatably connected to the connection frame and configured to rotate about a rotation axis and to operate to be in a first state of being folded to form a first angle with respect to the lens frame or a second state of being unfolded to form a second angle with respect to the lens frame, a printed circuit board (PCB) disposed in the temple and on which a wireless communication circuit is disposed, and an antenna structure including an antenna electrically connected to the wireless communication circuit. The antenna structure may include: a coupling terminal disposed on an end portion of the temple where the rotation axis is positioned, a first antenna disposed on the front frame (300) and including a first connection portion having at least a portion of a surface facing the coupling terminal, and a feeder configured to apply an electrical signal to the first antenna through the coupling terminal. The coupling terminal may include a first terminal portion facing the first connection portion in the first state, and a second terminal portion facing the first connection portion in the second state.

In an example embodiment, the first terminal portion may be configured to form a first terminal surface parallel to the surface of the first connection portion in the first state. The second terminal portion may be configured to form a second terminal surface parallel to the surface of the first connection portion in the second state.

In an example embodiment, the coupling terminal may form a first gap with the surface of the first connection portion through the first terminal portion in the first state, and form a second gap with the surface of the first connection portion through the second terminal portion in the second state.

In an example embodiment, the first gap and the second gap may be substantially the same.

In an example embodiment, the coupling terminal may further include a connecting terminal portion configured to connect the first terminal portion and the second terminal portion. The connecting terminal portion may form a connecting terminal surface of which at least a portion faces the first connection portion, based on an angle formed by the temple with respect to the lens frame being between the first angle and the second angle.

In an example embodiment, based on a cross-section orthogonal to the rotation axis, the connecting terminal surface may have a portion forming a minimum distance to the surface of the first connection portion configured to change depending on an angle of the temple formed with respect to the lens frame.

In an example embodiment, based on the angle of the temple formed with respect to the lens frame changing between the first angle and the second angle, a minimum distance between the connecting terminal surface and the first connection portion may be substantially constant.

In an example embodiment, the connecting terminal surface may form a curved surface.

In an example embodiment, based on a cross-section orthogonal to the rotation axis, the connecting terminal surface may form an arc centered on the rotation axis.

In an example embodiment, the first terminal portion may form a first terminal surface facing the surface of the first connection portion in the first state and directed to a first direction orthogonal to the rotation axis. The second terminal portion may form a second terminal surface facing the surface of the first connection portion in the second state and directed to a second direction orthogonal to the rotation axis.

In an example embodiment, the wearable electronic device may further include a second antenna disposed on the front frame and including a second connection portion at least a portion of a surface of which faces the coupling terminal. The coupling terminal may further include a third terminal portion on which a third terminal surface directed to a third direction parallel to the rotation axis and facing the second connection portion is formed.

In an example embodiment, the wearable electronic device may further include a third antenna disposed on the front frame and including a third connection portion at least a portion of a surface of which faces the coupling terminal. The coupling terminal may further include a fourth terminal portion on which a fourth terminal surface opposite to the third direction and facing the third connection portion is formed.

In an example embodiment, the first antenna may have a length different from a length of at least one of the second antenna and the third antenna.

In an example embodiment, the first antenna may further include a first antenna portion extending along a longitudinal direction of the connection frame from the first connection portion, and a second antenna portion extending from the first antenna portion to the lens frame.

In an example embodiment, at least a portion of the first antenna portion of the first antenna may be formed of a conductive material.

In an example embodiment, a wearable electronic device according to an example embodiment may include: a front frame including a lens frame configured to accommodate a lens, and a connection frame extending from the lens frame, a temple connected to the connection frame opposite to the front frame, a hinge configured to rotatably connect the connection frame and the temple about a rotation axis to be in a first state of being folded to form a first angle with respect to the lens frame or a second state of being unfolded to form a second angle with respect to the lens frame, a PCB disposed in the temple and on which a wireless communication circuit is disposed, and an antenna structure including an antenna electrically connected to the wireless communication circuit. The antenna structure may include: a coupling terminal disposed on an end portion of the temple adjacent to the hinge, a feeder configured to apply an electrical signal to the coupling terminal, and one or more antennas of which at least a portion is disposed on the connection frame is configured to receive the electrical signal applied by the feeder through the coupling terminal. The one or more antennas may include a first antenna including a first connection portion with a surface facing a connection direction orthogonal to the rotation axis. The coupling terminal may include, based on a state viewed in the connection direction, a first terminal portion overlapping the first connection portion in the first state, and a second terminal portion overlapping the first connection portion in the second state.

in In an example embodiment, the first terminal portion may form a first terminal surface facing a first direction parallel to the connection direction in the first state. The second terminal portion may form a second terminal surface facing a second direction parallel to the connection direction in the second state.

In an example embodiment, the coupling terminal may further form a third terminal portion forming a third terminal surface facing a third direction parallel to the rotation axis. The one or more antennas may further include a second antenna at least a portion of which overlaps the third terminal surface in a state in which the rotation axis is viewed.

In an example embodiment, the coupling terminal may further include a fourth terminal portion forming a fourth terminal surface facing a fourth direction opposite to the third direction. The one or more antennas may further include a third antenna at least a portion of which overlaps the fourth terminal surface in a state in which the rotation axis is viewed.

A wearable electronic device according to an example embodiment may include a front frame including a lens frame configured to accommodate a lens, and a connection frame extending from the lens frame, a temple configured to be rotatably connected to the connection frame about a rotation axis and operate to be in a first state of being folded to form a first angle with respect to the lens frame or a second state of being unfolded to form a second angle with respect to the lens frame, a PCB disposed in the temple and on which a wireless communication circuit is disposed, and an antenna structure including an antenna electrically connected to the wireless communication circuit. The antenna structure may include: a coupling terminal disposed on an end portion of the temple on which the rotation axis is positioned, a feeder configured to apply an electrical signal to the coupling terminal, and an antenna disposed on the front frame and configured to be electrically coupled to the coupling terminal in a non-contact state to receive an electrical signal applied by the feeder. The coupling terminal may include a first terminal portion having a surface facing a first direction orthogonal to the rotation axis, a second terminal portion having a surface facing a second direction orthogonal to the rotation axis and different from the first direction, and a connecting terminal portion connecting the first terminal portion and the second terminal portion and having a surface forming a curved surface. The antenna may overlap the first terminal portion in the first direction in the first state, and overlap the second terminal portion in the second direction (D2) in the second state.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:
a front frame comprising a lens frame configured to accommodate a lens, and a connection frame extending from the lens frame;
a temple rotatably connected to the connection frame and configured to rotate about a rotation axis and operate to be in a first state of being folded to form a first angle with respect to the lens frame or a second state of being unfolded to form a second angle with respect to the lens frame;
a printed circuit board (PCB) disposed in the temple and on which a wireless communication circuit is disposed; and
an antenna structure including an antenna electrically connected to the wireless communication circuit,
wherein the antenna structure comprises:
a coupling terminal disposed on an end portion of the temple where the rotation axis is positioned;
a first antenna disposed on the front frame and comprising a first connection portion at least a portion of a surface of which faces the coupling terminal; and
a feeder configured to apply an electrical signal to the first antenna through the coupling terminal, and
wherein the coupling terminal comprises:
a first terminal portion configured to be coupled to the first connection portion in the first state; and
a second terminal portion configured to be coupled to the first connection portion in the second state.

2. The wearable electronic device of claim 1, wherein
the first terminal portion includes a first terminal surface parallel to the surface of the first connection portion in the first state, and
the second terminal portion includes a second terminal surface parallel to the surface of the first connection portion in the second state.

3. The wearable electronic device of claim 1, wherein the coupling terminal includes a first gap with the surface of the first connection portion through the first terminal portion in the first state, and
includes a second gap with the surface of the first connection portion through the second terminal portion in the second state.

4. The wearable electronic device of claim 1, wherein the first gap and the second gap are substantially the same.

5. The wearable electronic device of claim 1, wherein
the coupling terminal further comprises a connecting terminal portion configured to connect the first terminal portion and the second terminal portion, and
the connecting terminal portion includes a connecting terminal surface at least a portion of which faces the first connection portion, based on an angle formed by the temple with respect to the lens frame being between the first angle and the second angle.

6. The wearable electronic device of claim 1, wherein, based on a cross-section orthogonal to the rotation axis, the connecting terminal surface has a portion forming a minimum distance to the surface of the first connection portion configured to change depending on an angle of the temple formed with respect to the lens frame.

7. The wearable electronic device of claim 1, wherein, based the angle of the temple formed with respect to the lens frame changing between the first angle and the second angle, a minimum distance between the connecting terminal surface and the first connection portion is substantially constant.

8. The wearable electronic device of claim 1, wherein the connecting terminal surface forms a curved surface.

9. The wearable electronic device of claim 1, wherein, based on a cross-section orthogonal to the rotation axis, the connecting terminal surface forms an arc centered on the rotation axis.

10. The wearable electronic device of claim 1, wherein
the first terminal portion includes a first terminal surface facing the surface of the first connection portion in the first state and is directed in a first direction orthogonal to the rotation axis, and
the second terminal portion includes a second terminal surface facing the surface of the first connection portion in the second state and is directed in a second direction orthogonal to the rotation axis.

11. The wearable electronic device of claim 1, further comprising:
a second antenna disposed on the front frame and comprising a second connection portion at least a portion of a surface of which faces the coupling terminal,
wherein the coupling terminal further comprises a third terminal portion on which a third terminal surface directed in a third direction parallel to the rotation axis and faces the second connection portion is formed.

12. The wearable electronic device of claim 1, further comprising:
a third antenna disposed on the front frame and comprising a third connection portion at least a portion of a surface of which faces the coupling terminal,
wherein the coupling terminal further comprises a fourth terminal portion on which a fourth terminal surface opposite to the third direction and faces the third connection portion is formed.

13. The wearable electronic device of claim 1, wherein the first antenna has a length different from a length of at least one of the second antenna and the third antenna.

14. The wearable electronic device of claim 1, wherein the first antenna further comprises:
a first antenna portion extending along a longitudinal direction of the connection frame from the first connection portion; and
a second antenna portion extending from the first antenna portion to the lens frame.

15. The wearable electronic device of claim 1, wherein at least a portion of the first antenna portion of the first antenna comprises a conductive material.

16. A wearable electronic device comprising:
a front frame including a lens frame configured to accommodate a lens, and a connection frame extending from the lens frame;
a temple connected to the connection frame opposite to the front frame;

a hinge configured to rotatably connect the connection frame and the temple about a rotation axis to be in a first state of being folded to form a first angle with respect to the lens frame or a second state of being unfolded to form a second angle with respect to the lens frame;

a PCB disposed in the temple and on which a wireless communication circuit is disposed; and an antenna structure including an antenna electrically connected to the wireless communication circuit, wherein the antenna structure comprises:

a coupling terminal disposed on an end portion of the temple adjacent to the hinge;

a feeder configured to apply an electrical signal to the coupling terminal; and one or more antennas of which at least a portion is disposed on the connection frame is configured to receive the electrical signal applied by the feeder through the coupling terminal, wherein the one or more antennas comprising a first antenna including a first connection portion with a surface facing a connection direction orthogonal to the rotation axis, wherein the coupling terminal comprising, based on a state viewed in the connection direction, a first terminal portion overlapping the first connection portion in the first state; and a second terminal portion overlapping the first connection portion in the second state.

17. The wearable electronic device of claim 16, wherein the first terminal portion form a first terminal surface facing a first direction parallel to the connection direction in the first state, and wherein the second terminal portion form a second terminal surface facing a second direction parallel to the connection direction in the second state.

18. The wearable electronic device of claim 16, wherein the coupling terminal further form a third terminal portion forming a third terminal surface facing a third direction parallel to the rotation axis, and wherein the one or more antennas further including a second antenna at least a portion of which overlaps the third terminal surface in a state in which the rotation axis is viewed.

19. The wearable electronic device of claim 18, wherein the coupling terminal further including a fourth terminal portion forming a fourth terminal surface facing a fourth direction opposite to the third direction, and wherein the one or more antennas further including a third antenna at least a portion of which overlaps the fourth terminal surface in a state in which the rotation axis is viewed.

20. A wearable electronic device comprising:

a front frame including a lens frame configured to accommodate a lens and a connection frame extending from the lens frame;

a temple configured to be rotatably connected to the connection frame about a rotation axis and operate to be in a first state of being folded to form a first angle with respect to the lens frame or a second state of being unfolded to form a second angle with respect to the lens frame;

a PCB disposed in the temple and on which a wireless communication circuit is disposed; and an antenna structure including an antenna electrically connected to the wireless communication circuit, wherein the antenna structure comprises:

a coupling terminal disposed on an end portion of the temple on which the rotation axis is positioned;

a feeder configured to apply an electrical signal to the coupling terminal; and an antenna disposed on the front frame and configured to be electrically coupled to the coupling terminal in a non-contact state to receive an electrical signal applied by the feeder, and wherein the coupling terminal comprises:

a first terminal portion having a surface facing a first direction orthogonal to the rotation axis;

a second terminal portion having a surface facing a second direction orthogonal to the rotation axis and different from the first direction; and a connecting terminal portion connecting the first terminal portion and the second terminal portion and having a surface forming a curved surface, and wherein the antenna overlap the first terminal portion in the first direction in the first state, and overlap the second terminal portion in the second direction in the second state.

* * * * *